United States Patent
Murer et al.

(10) Patent No.: US 11,633,734 B2
(45) Date of Patent: Apr. 25, 2023

(54) DEVICE FOR SYNTHESIZING OLIGONUCLEOTIDES

(71) Applicant: Kilobaser GmbH, Graz (AT)

(72) Inventors: Alexander Murer, Graz (AT); Martin Jost, Graz (AT); Bernhard Tittelbach, Graz (AT); Reinhard Diethardt, Weißkirchen (AT)

(73) Assignee: Kilobaser GmbH, Graz (AT)

( * ) Notice: Subject to any disclaimer, the term of this patent is extended or adjusted under 35 U.S.C. 154(b) by 856 days.

(21) Appl. No.: 16/487,776

(22) PCT Filed: Feb. 22, 2018

(86) PCT No.: PCT/EP2018/054410
§ 371 (c)(1),
(2) Date: Aug. 21, 2019

(87) PCT Pub. No.: WO2018/153999
PCT Pub. Date: Aug. 30, 2018

(65) Prior Publication Data
US 2019/0374946 A1    Dec. 12, 2019

(30) Foreign Application Priority Data
Feb. 22, 2017 (EP) .................... 17157421

(51) Int. Cl.
*B01L 3/00* (2006.01)
*B01J 19/00* (2006.01)
*F16K 99/00* (2006.01)

(52) U.S. Cl.
CPC ..... *B01L 3/502715* (2013.01); *B01J 19/0046* (2013.01); *B01J 19/0093* (2013.01);
(Continued)

(58) Field of Classification Search
CPC ......... B01L 3/502715; B01L 3/502738; B01L 2200/027; B01L 2200/028; B01J 19/0046;
(Continued)

(56) References Cited

U.S. PATENT DOCUMENTS

| 9,649,632 B2 * | 5/2017 | Van Dam .......... B01L 3/502753 |
| 2003/0008411 A1 | 1/2003 | Van Dam et al. |

(Continued)

FOREIGN PATENT DOCUMENTS

| WO | 03057010 A2 | 7/2003 |
| WO | 2008024319 A2 | 2/2008 |
| WO | 2009054870 A2 | 4/2009 |

OTHER PUBLICATIONS

Third Office Action from CNIPA in CN201880026402.5, dated May 7, 2022, 15 pages.
(Continued)

*Primary Examiner* — Brian J. Sines
(74) *Attorney, Agent, or Firm* — McKee, Voorhees & Sease, PLC

(57) ABSTRACT

The invention relates to a device for synthesising oligonucleotides, comprising: a reagent container receptacle (1) for holding a reagent container support (17) comprising multiple reagent containers (18); an exchangeable microfluid chip (10) comprising a synthesis chamber, fluid connectors and microfluid valves; a control device (5); fluid connecting means (2); wherein the device can be loaded with the microfluid chip (10) and the reagent container support (17) when in a loading position; a chip receptacle (3). To allow cost-effective and prompt synthesis even of small amounts of oligonucleotides, the invention provides for an actuator device (6) to be provided, with which the reagent container receptacle (1), the microfluid chip (10) and the fluid connecting means (2) can be brought from the loading position to an operating position, in which operating
(Continued)

position the reagent container receptacle (1), the chip receptacle (3) and the fluid connecting means (2) are positioned relative to each other such that reagents can be conveyed out of the reagent containers (18) towards the synthesis chamber (14) depending on the valve position of the microfluid valves.

22 Claims, 9 Drawing Sheets

(52) U.S. Cl.
CPC .... *B01L 3/502738* (2013.01); *F16K 99/0015* (2013.01); *B01J 2219/00398* (2013.01); *B01J 2219/00418* (2013.01); *B01J 2219/00689* (2013.01); *B01J 2219/00722* (2013.01); *B01J 2219/00894* (2013.01); *B01J 2219/00986* (2013.01); *B01L 2200/027* (2013.01); *B01L 2300/06* (2013.01); *B01L 2300/0816* (2013.01); *B01L 2300/0864* (2013.01); *B01L 2300/0883* (2013.01); *B01L 2300/10* (2013.01); *B01L 2400/0487* (2013.01); *B01L 2400/0633* (2013.01); *F16K 2099/0084* (2013.01)

(58) Field of Classification Search
CPC .......... B01J 19/0093; B01J 2219/00418; B01J 2219/00695; B01J 2219/00689; B01J 2219/00691; B01J 2219/00722; F16K 2099/0084

See application file for complete search history.

(56) References Cited

U.S. PATENT DOCUMENTS

| | | | | |
|---|---|---|---|---|
| 2004/0219661 | A1* | 11/2004 | Chen ................. | B01L 3/502715 435/288.5 |
| 2008/0299013 | A1* | 12/2008 | Trieu ...................... | B01L 9/527 422/400 |
| 2010/0320748 | A1* | 12/2010 | Van't Oever ..... | B01L 3/502715 285/38 |
| 2012/0128549 | A1* | 5/2012 | Zhou ................... | F16K 99/0015 422/504 |
| 2013/0203634 | A1* | 8/2013 | Jovanovich ......... | F16K 99/0015 506/26 |
| 2015/0118110 | A1* | 4/2015 | Hahn ................. | G01N 35/0098 422/505 |

OTHER PUBLICATIONS

English Translation of International Search Report filed in connection to PCT/EP2018/054410 filed Feb. 22, 2018, 3 pages, dated Apr. 6, 2018.
Written Opinion filed in connection to PCT/EP2018/054410 filed Feb. 22, 2018, 6 pages, dated Aug. 30, 2018.
English Translation of China National Intellectual Property Administration, "The First Office Action", issued in connection with Application No. 201880026402.5, 13 pages, dated Mar. 1, 2021.
China National Intellectual Property Administration, "The First Office Action", issued in connection with Application No. 201880026402.5, 5 pages, dated Mar. 1, 2021.

* cited by examiner

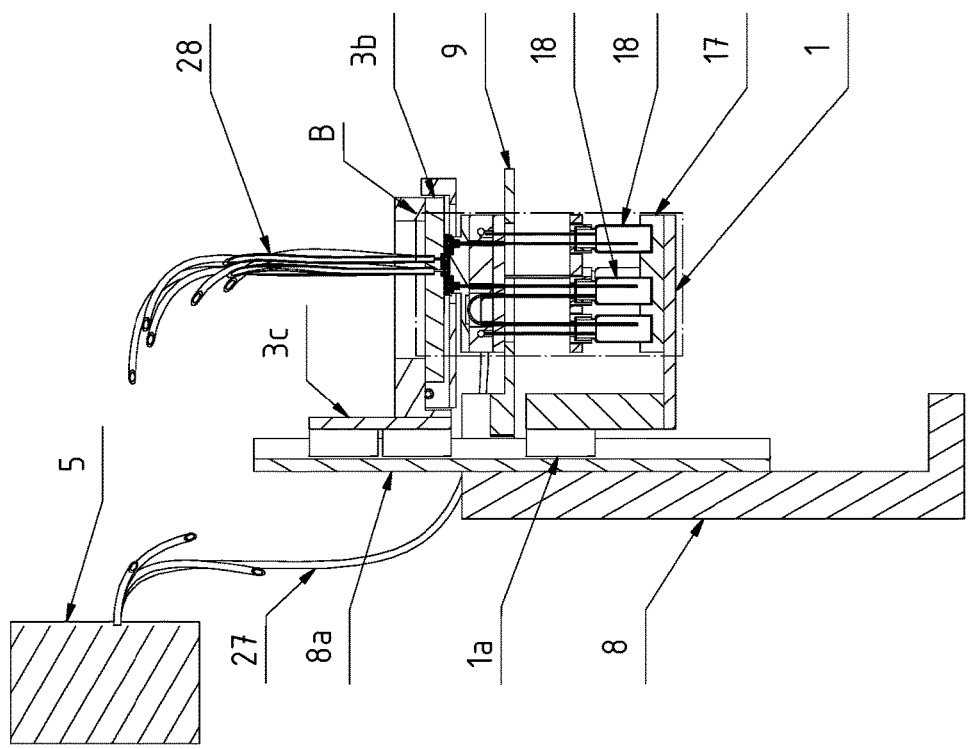
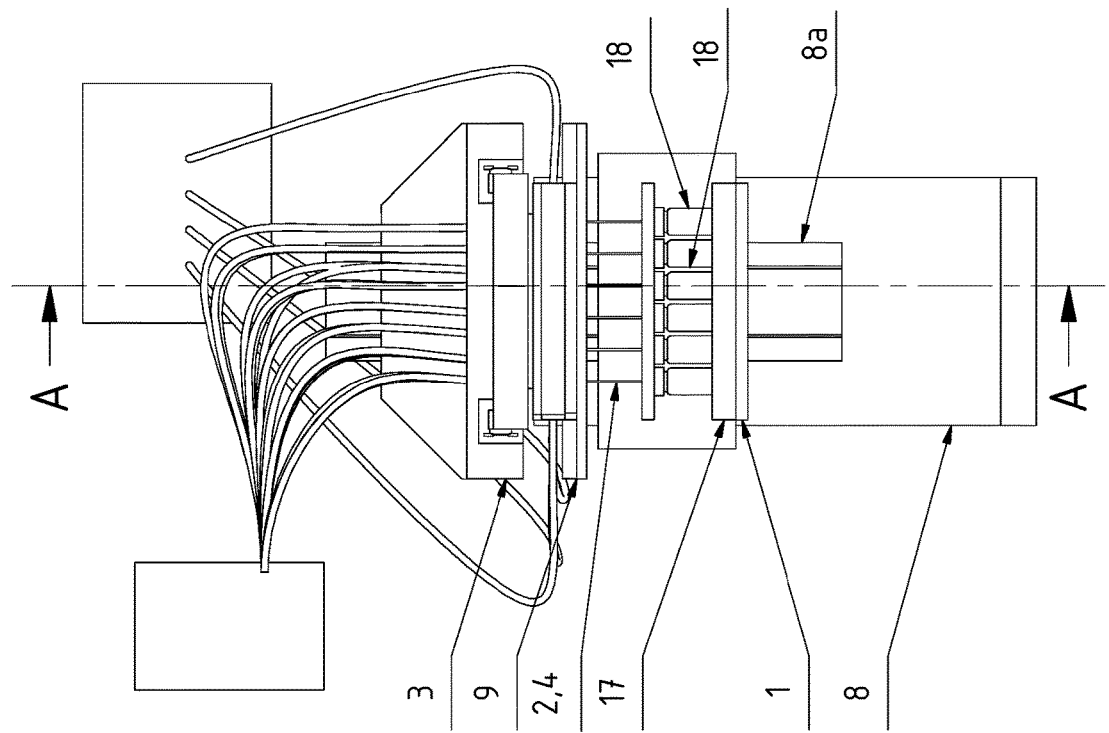

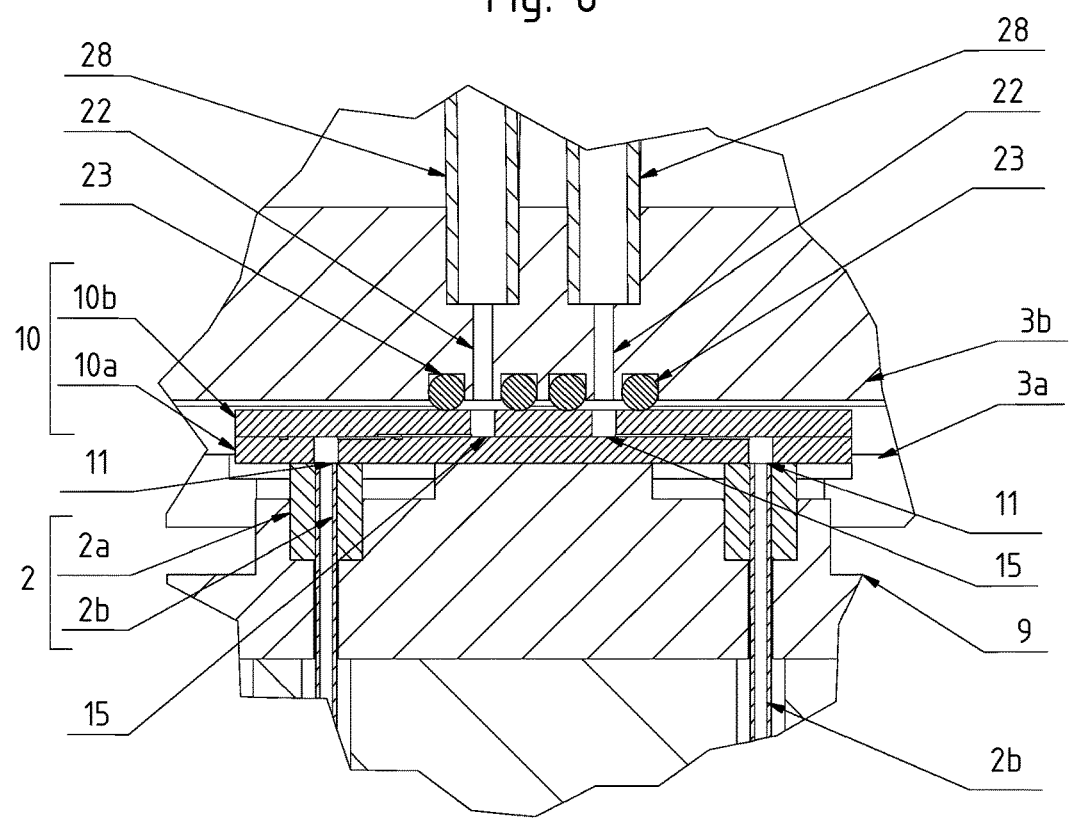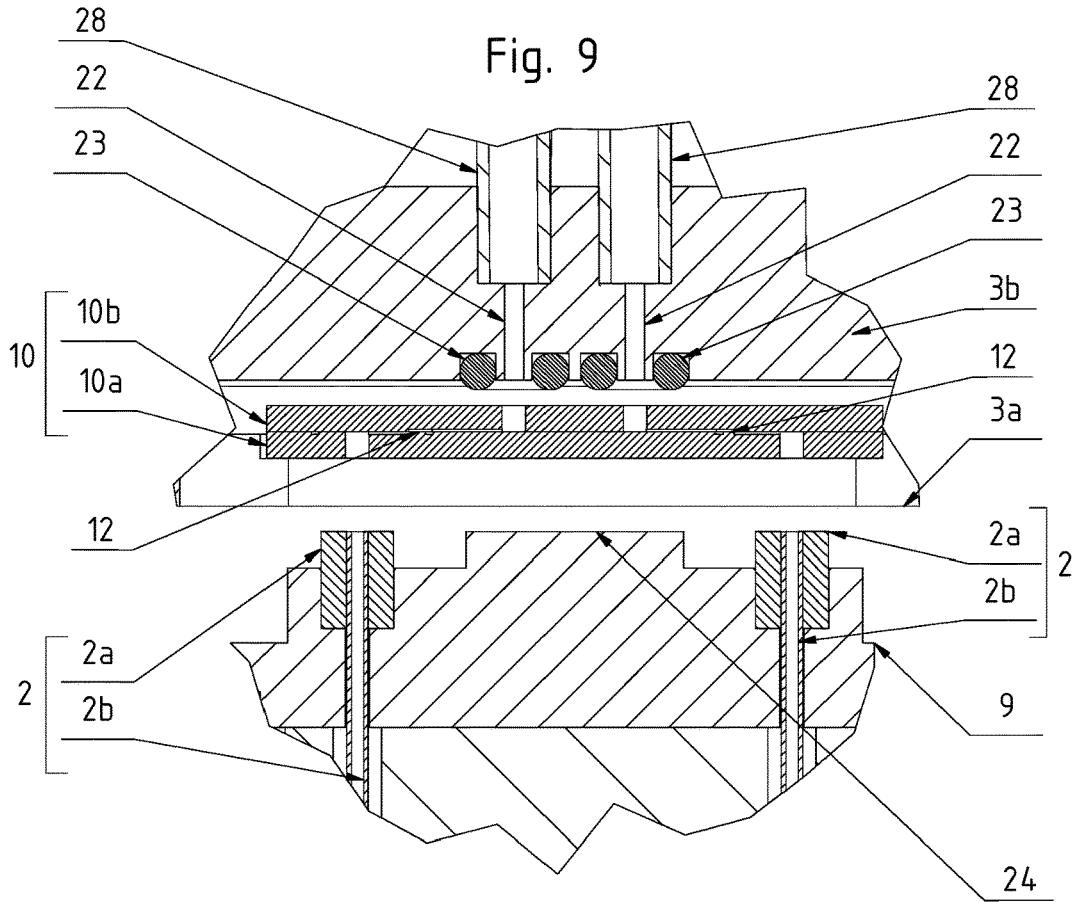

DEVICE FOR SYNTHESIZING OLIGONUCLEOTIDES

CROSS-REFERENCE TO RELATED APPLICATIONS

This is a national phase application of PCT application serial No. PCT/EP18/54410 filed Feb. 22, 2018 and claims priority to Europe patent application serial no. 17157421.3 filed Feb. 22, 2017, each of which is incorporated by reference in its entirety.

FIELD OF THE INVENTION

The invention relates to a device for synthetizing oligonucleotides, preferably DNA strands, as well as to a microfluid chip for a device for synthetizing oligonucleotides, a reagent container support to be held in a device for the synthesis of oligonucleotides and to a method for operating a device for the synthesis of oligonucleotides.

BACKGROUND OF THE INVENTION

Oligonucleotides are oligomers that are constructed out of a small number of nucleotides, both DNA and RNA. For example, the oligonucleotides can be fragments of a DNA or RNA strand containing a large number of nucleotides. The nucleotide sequence of an oligonucleotide is generally made up of between 15 and 100, preferably between 15 and 50, nucleotide units, wherein shorter or longer nucleotide sequences are also conceivable.

In particular in the field of molecular biology, oligonucleotides play an important part, since they are used, for example, as primers for polymerase chain reactions (PCR), as primers for DNA sequencing, as building blocks for vector design or as building blocks for synthetic gene synthesis. Oligonucleotides are also used as probes, in particular in Real Time Quantitative PCR, or in oligonucleotide chips.

Oligonucleotides are generally producible through a purely chemical synthesis, in which individual nucleotides are directly linked with each other by means of suitable catalysts.

For the synthesis of whole DNA strands, methods of recombinational DNA synthesis are normally used, in which the DNA strands are replicated and multiplied naturally, then split and then linked together once again, in order to achieve the DNA sequence required. Alternatively, longer DNA strands with any arbitrary DNA sequence can be created from shorter, chemically synthesized oligonucleotides using appropriate enzymatic catalysts.

For practical laboratory operations, oligonucleotides must be newly synthesized each time as a starting material. Often in laboratory settings, particularly in small and medium-sized laboratories, the necessary infrastructure for the synthesis of oligonucleotides is not available. Devices for DNA synthesis in accordance with prior art, also known as DNA synthesizers, are generally large pieces of equipment that have to be fitted out with several containers with organic/chemical synthesis reagents. Some reagents have a limited lifespan following the fitting out, so that a DNA synthesizer must be kept in continuous operation in practice. During operation, mainly due to the internal volumes of the equipment, several liters of organic solution waste is generated and this has to be specially disposed of. Therefore, specialized operators are generally required for handling the DNA synthesizer and the reagents as well as the waste.

In order to avoid this problem and to save costs, the oligonucleotide synthesis is generally outsourced to third-party manufacturers. However, obtaining oligonucleotides from an external manufacturer has considerable disadvantages with regard to the time and also costs: since the manufacture by a third party is generally only carried out according to need, a considerable amount of time is lost in the outsourcing of the synthesis, because in addition to the time required for the synthesis, the manufacturer's order capacity, delays in delivery and transport times must also be taken into account. Thus in practice it is often not possible to get hold of the necessary oligonucleotides when needed. Therefore the ordering of the oligonucleotides has to be planned well in advance, in order to guarantee that they are available in the laboratory at the right time. This process can considerably impede the speed of research of a laboratory, in particular if the result of one research cycle has to flow into the planning of the next one. Due to the resulting delays and waiting times, extra staff costs are incurred, which can considerably reduce the research results that can be achieved on the given research budget.

For the synthesis of individually used short oligonucleotides (mainly primers) having a length of up to two hundred nucleotides, the column-based synthesis remains the prior art. For the reasons described, the development of DNA synthesizers in the last decades has shifted from devices for use in a company-owned laboratory in the direction of more efficient facilities for industrial use of third-party manufacturers. The focus on development is today therefore generally on higher parallel synthesis throughput via the implementation of dozens to hundreds of columns and improved automation. One extreme of this development can be seen in the use of DNA microarray chips for synthesis. In this case, several thousand linker spots on the surface of a chip serve as the starting point for the parallel synthesis of short oligonucleotides with different sequences. These are then merged together as synthetic genes, for example, wherein time-consuming theoretical methods have to be implemented, in order to avoid undesirable oligonucleotide combinations. An increasing theoretical throughput, requires an increasing capacity utilization, in order to ensure the cost-effectiveness of such facilities and processes. A development in the opposite direction of said high-throughput applications is currently represented by a high demand for oligonucleotides with additional integrated, modified nucleotides, that can act as probes or "tag" molecules, i.e. as a defined adhesion molecule in different applications. It is true that these are synthesized in lower total volumes on smaller dimensioned equipment, but they are generally still obtained from external manufacturers.

A further disadvantage of the prior art can be found furthermore in the fact that the nucleotide sequence has to be provided to the external manufacturer, so that the risk of a wrongful misappropriation fundamentally exists.

OBJECT OF THE INVENTION

It is therefore an object of the invention to overcome the disadvantages of the prior art and to suggest a device for the synthesis of oligonucleotides that enables the timely and therefore cost-effective synthesis of even small amounts of oligonucleotides. In addition, the operation and procurement of the device according to the invention shall also be viable for small and medium-sized laboratories.

SUMMARY OF THE INVENTION

The device according to the invention comprises a plurality of components, the interaction of which enables the synthesis of oligonucleotides in an operating position of the device. These components comprise a reagent container receptacle, which can be equipped with reagents for the performance of the synthesis, an exchangeable microfluid chip in which the synthesis of the oligonucleotides takes place in a synthesis chamber, fluid connecting means, via which the reagents can be conveyed from the reagent containers to the microfluid chip as well as a control device to regulate the transport of the reagents into the synthesis chamber. The synthesis chamber can, for example, contain a carrier medium, which presents linker molecules for starting the synthesis reaction. It is conceivable that porous structures are provided as the carrier medium, for example, such as so-called beads made of controlled pure glass (CPG) or macroporous polystyrene (MPPS). In order to keep the carrier medium in the synthesis chamber during the flow through the synthesis chamber with a reagent, a restraining structure can be envisaged. Furthermore, it would be conceivable that the surface of the synthesis chamber itself was modified in such a way that it carried linker molecules and/or is provided with a large overall surface by using appropriate methods for increasing the surface.

One aspect of the invention is that the reagent container receptacle, the fluid connecting means, and preferably also the control device are positioned in such a way in the device that, in a loading position, the microfluid chip can be inserted into the device and the reagent container receptacle can be loaded with reagents. In order to facilitate these processes, the microfluid chip and the reagent containers in the reagent container receptacle, preferably of the reagent container support, are not connected to the fluid connecting means in the loading position.

The microfluid chip in which the synthesis takes place is interchangeable, since one individual chip is usually suitable only for a limited number of syntheses. For the most part just one synthesis process is possible with one chip, so that after each synthesis the chip has to be exchanged, whereby the used chip with which the previous synthesis was carried out must be removed from the device and the device must be equipped with a new microfluid chip. Normally at least the loading, preferably also the removal of the used chip, occur in the loading position.

In the loading position the reagent container receptacle can on the one hand be loaded with reagent containers and on the other hand empty reagent containers can be removed from the reagent container receptacle. Thus an exchange of the reagent containers and the reagents contained in them is possible. Thereby it is advantageous if at least two reagent containers, preferably all reagent containers, are integrated into a reagent container receptacle. Thus the reagent containers are tightly linked to each other by the reagent container receptacle and can only be exchanged as a unit. Thus an empty reagent container receptacle can be replaced simply and easily as a consumable part by a new, filled reagent container receptacle, without the user having to refill and monitor the reagents individually.

In the microfluid chip the known microfluid behavior of liquids is utilized, wherein the diameter of the microfluid channels is generally less than a millimeter, conventionally between 100 nanometers and 500 micrometers. In particular, flows with particularly low Reynolds numbers are formed, which corresponds to an almost perfect laminar flow. The microfluid chip comprises a series of fluid connectors that are connectable with the fluid connecting means in order to transport reagents from the reagent containers in the direction of the synthesis chamber. For each reagent that is needed for the synthesis, at least one separate fluid connector is provided. The fluid connectors are connected to the synthesis chamber via a fluid connection, which is normally constructed on a microfluid basis at least in portions. For example, the synthesis chamber can be arranged in a synthesis channel in the fluid connection. Each fluid connector is allocated to a microfluid valve, via which the fluid connection between the fluid connector and the synthesis chamber is switchable from a closed state, in which the fluid connection is interrupted and no reagent can flow in the direction of the synthesis chamber, to an open state, in which the fluid connection is open. Naturally it is also conceivable that the microfluid valve may be brought into a valve position in which the microfluid valve is partially open.

A further aspect of the invention is found in the fact that the reagent container receptacle, the fluid connecting means, the microfluid chip and preferably also the control device are positioned in an operating position in the device in such a way that a connection between the reagent containers positioned in the reagent container receptacle and the fluid connectors of the microfluid chip is created via the fluid connecting means and the microfluid chip is connected to the control device in order to enable a controlled actuation of the microfluid valve. Thereby the control device is constructed to control the valve position of the microfluid valve in such a way, that the reagents are conveyed into the synthesis chamber in a quantity, which is predetermined by the synthesis.

For the actuation of the microfluid valve it is advantageous if the control device comprises a pneumatic system via which the microfluid valve can be controlled. A pneumatic system is particularly advantageous if the microfluid valves of the microfluid chip comprise a membrane and the membrane releases or interrupts the fluid connection by means of a change of pressure on the membrane provided by the pneumatic system of the control device. It is also conceivable that the microfluid valve is mechanically actuated, for example via piezoelectric elements.

The pneumatic system of the control device thus comprises as a rule a plurality of control lines that are directly or indirectly connectible to the microfluid valve, for example via a connector portion of the chip receptacle. The control lines can take the form of hoses or pipes, for example.

In the operating position, the synthesis of the oligonucleotides can be carried out in the order prescribed by the control device, in which the valve of the microfluid valve is released and closed once again. Due to the small size of the microfluid chip, in which the synthesis takes place, which is caused by its microfluidic properties, the construction size of the device is considerably reduced. Likewise, even small quantities of oligonucleotides can be produced cost effectively by the device according to the invention, since no external manufacturer is required. The device according to the invention is also characterized by its user-friendliness, since merely the reagent container receptacle has to be loaded with the reagents and the device has to be loaded with a microfluid chip and the nucleotide sequence of the oligonucleotides has to be fed into the control device in order to start the synthesis.

Therefore said object of the invention is achieved in a device according to the invention for synthesizing oligonucleotides, preferably DNA strands, in that the device comprises the following components:
 a reagent container receptacle for holding a reagent container support comprising multiple reagent containers for the synthesis of oligonucleotides;

an exchangeable microfluid chip comprising a synthesis chamber for the synthesis of oligonucleotides, fluid connectors for the provision of reagents as well as microfluid valves, wherein the fluid connectors are connected via a fluid connection to the synthesis chamber and the fluid connection between one fluid connector and the synthesis chamber can be interrupted or released respectively by means of one of the microfluid valves;

a control device, preferably including a pneumatic system, for the control of the microfluid valves;

fluid connecting means for the transport of the reagents from the reagent containers to the fluid connectors of the microfluid chip, wherein the device with the microfluid chip is loadable in one loading position and the reagent container receptacle is loadable with the reagent container support, the microfluid chip and the fluid connecting means can be brought from the loading position into an operating position, in which operating position the reagent container receptacle, the microfluid chip and the fluid connecting means are positioned relative to each other in such a way that the microfluid valves of the microfluid chip are connected to the control device, so that the reagent containers arranged in the reagent container receptacle are connected to the fluid connectors of the microfluid chip via the fluid connecting means, so that depending on the valve position of the microfluid valve, reagents can be conveyed out of the reagent containers towards the synthesis chamber.

The microfluid technology used in the device according to the invention facilitates, compared to the prior art, a more efficient use of reagents without technical losses. The reduction in the supply of reagents facilitates the handling to such an extent, that the invention can be operated directly in small and medium-sized laboratories instead of industrial third-party manufacturers.

Fundamentally, the reagent container receptacle, the microfluid chip and the fluid connecting means and preferably the control device can be connected movably in the device along any movement direction, for example linear movement directions, circular paths or curved paths, in order to be moved from the loading position to the operating position. The movement can be realized either by an actuator device, which preferably comprises one or a plurality of electrical drive units or manually operated mechanisms, or by hand.

In one embodiment variant of the invention it is anticipated that an actuator device is provided, with which actuator device the reagent container receptacle, the microfluid chip, the fluid connecting means and preferably the control device are movable from the loading position to the operating position, wherein the actuator device preferably has a linear movement axis and the positioning of the reagent container receptacle or the fluid connecting means or the microfluid chip is made along the actuator device. In other words, one or several or all elements can be positioned along the movement axis. By means of the actuator device the device can be automatically transferred from the loading position to the operating position. By means of the linear movement, easily controllable kinematic relations are provided and the necessary mechanism can be manufactured cost effectively.

In order to position the microfluid chip, a chip receptacle is generally provided, in which the microfluid chip is insertable in the loading position. By displacing the chip receptacle along the preferably linear movement axis of the actuator device, the chip can be positioned along the movement axis. The chip receptacle can have a drawer-like, extendable loading tray for the easy replacement of the microfluid chip, which, from the loading position, in which the microfluid chip is insertable in the loading tray, is movable in an intermediate position, in which the fluid connectors of the microfluid chip are aligned with the fluid connecting means. Preferably the movement of the loading tray is in a normal direction to the linear movement axis in this.

It is also advantageous if the chip receptacle has one, preferably plate-shaped, connecting portion for the connection of the microfluid chip to the control device. The connecting portion is preferably positioned on the opposite side of the microfluid chip to the fluid connecting means and serves also as a clamping surface for clamping the microfluid chip. For example, the connecting portion can have control line channels for the pneumatic system of the control device, which in the operating position are always connected to one microfluid valve of the microfluid chip. Preferably, in each case a control line channel of the connecting portion is connected to the control line of the pneumatic system of the control device.

Generally, it is conceivable that via the actuator device both the chip receptacle, reagent container receptacle as well as the fluid connecting means are attached moveably to a rack on the actuator device along the linear movement axis, or that either the chip receptacle or the reagent container receptacle are attached rigidly, while the other two elements are attached in a shiftable way.

A further embodiment variant of the invention, which facilitates a particularly simple construction of the device, provides that the actuator device has a rack, wherein the fluid connecting means, preferably by means of a support plate, are rigidly fixed to a rack and wherein the reagent container receptacle and the chip receptacle for the loading of the microfluid chip, preferably linear along the movement axis, in the direction of the fluid connecting means are attached to the rack so that they can be moved or swiveled, in order to move the reagent container receptacle and the microfluid chip, preferably via the positioning of the chip receptacle, from the loading position into the operating position and vice versa. Preferably, the chip receptacle or the reagent container receptacle are designed as sleds, which are translationally moveable along at least one of the tracks formed by the rack. It is also conceivable that the actuator device for the chip receptacle has a swivel mechanism, wherein by swiveling the swivel mechanism the connection of the microfluid valves to the control device is carried out and preferably the microfluid chip is clamped. It is therefore particularly advantageous if the connector portion of the chip receptacle is configured to be able to swivel by means of the actuator device. The actuator device can, in particular for the movement of the chip receptacle designed as a sled and or reagent container receptacle, have, for example, one or a plurality of spindle drives or belt drives and or linear motors.

It is advantageous if the microfluid chip is clamped between a clamping surface of the chip receptacle and a clamping surface of the support plate through the displacement of the chip receptacle in the operating position. It is particularly advantageous if the support plate has a support element, wherein the microfluid chip in the operating position is laid flat on the support element.

In order to exploit the construction space in the device particularly well and thus to keep the size of the devices as small as possible, the fluid connecting means are arranged between the reagent container receptacle and the microfluid chip. The fluid connectors, which are connected in the operating position to the fluid connecting means, are configured on one side of the chip, for example on the underside. The connection to the control device, preferably to the pneumatic system of the control device, is carried out on the opposite side of the chip, for example on the upper side, so that there is both sufficient construction space for the fluid connecting means, preferably in the support plate, as well as sufficient construction space for the part of the control device necessary for the actuation of the valves, preferably in the chip receptacle. Therefore it is provided in a further embodiment variant of the invention that the components of the device in the operating position are positioned relative to each other in the following order, preferably in the direction of the movement axis:

reagent container receptacle
fluid connecting means
microfluid chip, wherein the fluid connectors are arranged on aside of the microfluid chip facing the fluid connecting means and the microfluid valves are arranged on a side of the microfluid chip facing away from the fluid connecting means on the control device.

Fluid connection means or connection means in general are elements allowing a flow-through, such as lines, pipes, hoses or tubes. The connection means can also include a plurality of components, such as a transport line configured as a flow-through element and a connecting piece for the connection of the microfluid chip or for the connection to a pneumatic system. The connection means, in particular the pneumatic connecting means, can also exist as one, preferably needle-like, transport line respectively.

In order to create an airtight connection between the fluid connectors of the microfluid chip and the fluid connecting means in the operating state, in a preferred embodiment variant of the device according to the invention, it is provided that each fluid connecting means includes a connector piece for connection with one of the fluid connectors of the microfluid chip and one, preferably needle-like, transport line, for the connection to one of the reagent containers. The connection piece can, for example, be configured as a metal sleeve, which can be compressed with a microfluid connector that is designed as a bulge in the form of a sleeve of the microfluid chip. In a further embodiment variant, the connection piece can be configured as a sealing element, preferably in plastic, in particular rubber, so that the seal in the operating position is achieved by pressing one of the fluid connectors, preferably in the shape of a circular ring, surrounding the sealing surface of the microfluid chip. Preferably the transport line is needle-like, in other words with a small cross-portional area in relation to the length of the transport line, wherein the end of the connector piece is arranged at one end of the transport line. The end of the transport line facing opposite to the connector piece is configured to penetrate a sealing element of a reagent container, preferably a septum.

According to a further embodiment variant of the invention, pneumatic connecting means are provided, via which a pneumatic system, preferably the pneumatic system of the control device, is connectable in the operating position with the reagent containers arranged in the reagent container receptacle, in order to convey reagents via the fluid connecting means in the direction of the microfluid chip. By pneumatic system, at least one pipe system, sealable via a pneumatic valve is understood, in which there is a, preferably inert, pressurized gas. The pneumatic system for the conveying of the reagents can be the pneumatic system of the control device, via which the microfluid valves are also controlled. It is also conceivable that the pneumatic system for the conveying of the reagents is a separate closed system. For connection to the pneumatic connecting means the pneumatic system can, preferably the pneumatic system of the control device, have gas lines, which are connectable, directly or indirectly, in particular via gas line channels in the support plate, with the pneumatic connecting means. When the reagent container is connected, the gas pressure of the pneumatic system can exert pressure on the reagents in the reagent container via the valve setting of the pneumatic valve, in order to convey the reagents via the fluid connecting means in the direction of the microfluid chip.

In analogy to the fluid connecting means, the pneumatic connecting means can have a sleeve-shaped connector piece for connection with the pneumatic system and a, preferably needle-like, transport line for conveying a gaseous medium from the pneumatic system into the reagent container. It is however preferable, if the pneumatic connecting means are configured as a, preferably needle-like, transport line. Preferably the transport line is needle-like, in other words with a small cross-sectional area in relation to the length of the transport line, wherein the end of the connector piece can be positioned at one end of the transport line. One of the ends of the transport line is configured to penetrate a sealing element of a reagent container, preferably a septum.

It is particularly advantageous if the fluid connecting means and the pneumatic connecting means are attached to the support plate, which is firmly fixed to the rack. In particular, it can be provided that the support plate has gas line channels via which in the operating state gas from the pneumatic system reaches the pneumatic connecting means. The gas line channels can be connected to the gas lines of the pneumatic system, in particular the pneumatic system of the control device.

It is thus self-evident that the support plate can also be configured in a plurality of parts and that the individual components, in particular those components provided for the connection of the fluid or pneumatic connecting means, are combined as an assembly of the support plate.

The reagent containers, which in the operating position are preferably positioned in the form of a reagent container receptacle in the reagent container receptacle, are sealed with a sealing element, for example a septum, so they are almost gas-proof, in order to prevent a reaction of the reagents with the environment. In other words, the reagent container contains an enclosed volume closed off by the sealing element in which are one the one hand the reagents and on the other hand an inert gas. In the operating position there is in one reagent container holding a liquid reagent both an end of a fluid as well as a pneumatic connecting means, wherein conventionally it is an end of the needle-like transport line of the relevant connecting means. As a rule the end of the fluid connecting means dips into the reagent, while the end of the pneumatic connecting means does not dip in the reagent, but ends above the surface of the reagent. In other words the end of the pneumatic connecting means is arranged closer to the sealing element, while the end of the fluid connecting means is closer to one of the bottom surfaces of the reagent container facing opposite the sealing element. If gas from the pneumatic system now flows into the sealed volumes of the reagent container via the pneumatic connecting means, the pressure in the volumes rises and reagent is conveyed via the fluid connecting means in the direction of the synthesis chamber. Thus in a more preferred embodiment variant of the invention it is provided that in the operating position one end of a transport line of one of the fluid connecting means and one end of one of the pneumatic connecting means respectively are arranged within one of the one liquid reagent containers containing the reagent, in order to convey reagents from the reagent container in the synthesis chamber via the gas pressure of the pneumatic system, wherein the transport line and the pneumatic connecting means penetrate a sealing element of the corresponding reagent container.

In addition to reagents that are already present in liquid form, it can also be provided that some reagents are present as solids, for example in the form of a powder, and are only dissolved before the start of the synthesis. This is advantageous, for example, for the synthesis of phosphoramidites of the bases adenine, guanine, cytosine, thymine or uracil used by oligonucleotides. The reactivity or activity of the phosphoramidites dissolved in the solvent reduces significantly after 14 days, so that a new reagent container receptacle has to be used within the shortest time following production and cannot be temporarily stored if the phosphoramidites are already present in a dissolved form in a reagent container. In order to overcome these disadvantages, a reagent container with a solvent, preferably acetonitrile, is provided for each reagent container filled with a phosphoramidite in the reagent container receptacle. The reagent container with the solvent is thus connected to the reagent container filled with the solid via a connecting line, wherein the end of the pneumatic connecting means is arranged in the reagent container with the solvent, preferably above the surface of the reagent, and the end of the fluid connecting means is arranged in the reagent container with the solid. Both ends of the connecting line penetrate, preferably needle-like, the respective sealing element of the one reagent container, so that one end of the connecting line is arranged in the reagent container with the solvent and the other end is arranged in the reagent container with the solid. Transport is carried out in analogy with the description above, however, the solvent first reaches the reagent container with the solid via the connecting line, where the solid dissolves in the solvent, before the gas via the connecting line flows into the reagent container with the now dissolved solid and increases the pressure in volumes, so that the solution is conveyed via the fluid connecting means in the direction of the synthesis chamber. Thus in a more preferred embodiment variant of the invention it is provided that a pair of corresponding reagent containers are arranged in the reagent container receptacle, wherein one of the container receptacles holds a solid, preferably phosphoramidites of the bases adenine, guanine, cytosine, thymine or uracil in powder form, and one of the container receptacles holds a solvent, preferably acetonitrile, and that in the operating position one end of one of the pneumatic connecting lines is arranged in the reagent container with the solvent and one end of a transport line of one of the fluid connecting means is arranged in the reagent container with the solid and that a connecting line connects both reagent containers with each other, so that via the gas pressure of the pneumatic system solvent from the one reagent container is transferred to the other reagent container, the solid in the reagent container dissolves in the solvent and the solution can be conveyed in the direction of the synthesis chamber.

In a further embodiment variant of the invention it is provided that the reagent containers are sealed with a sealing element respectively and the pneumatic connecting means are configured in such a way that with the movement from the loading position to the operating position the sealing elements of a plurality, preferably of all, reagent containers are penetrated at the same time.

According to a further embodiment variant of the invention it is provided that the reagent containers are sealed by a respective sealing element and the fluid connecting means are configured in such a way that with the movement from the loading position to the operating position the sealing elements of a plurality, preferably of all, reagent containers are penetrated at the same time.

It is particularly preferred that the fluid connecting means and the pneumatic connecting means are configured in such a way that the sealing elements are penetrated at different times.

The simultaneous penetration of the sealing elements of a plurality of reagent containers facilitates the use of reagent containers and sealing elements that are identical in construction as well as of fluid or pneumatic connecting means of the same length for all the corresponding reagent containers, wherein the technical construction of the device is considerably simplified and its cost effectiveness increased. It is particularly preferred that all the sealing elements of all the reagent containers are penetrated simultaneously, so that the previously described effects are applicable for all the fluid or pneumatic connecting means or for all the reagent containers.

One aspect of the invention concerns the simple handling of the device by the user. In the known device for the synthesis of oligonucleotides the filling levels of the reagents in the reagent containers have to be monitored individually and the reagents have to be topped up individually or connected, in order to guarantee the functionality of the device. Therefore in the laboratory all the reagents for refilling the reagent containers must be kept in stock. In a device according to the invention for the synthesis of oligonucleotides, this disadvantage in the prior art is overcome in that a reagent container support is provided that includes all the reagent containers for all the necessary reagents for the synthesis. The reagent containers are thus bound together as a unit by the reagent container receptacle, so that the reagent containers no longer have to be monitored, refilled and removed on an individual basis. The reagent container receptacle can therefore be exchanged as a unit after a predefined number of syntheses based on the quantity of reagents and replaced by a new, filled reagent container receptacle. The reagent container receptacle thus represents a simple to use replacement part that makes the costly storage and procurement of the different reagents obsolete. According to this embodiment variant of the invention, it is only necessary to store at least one reagent container receptacle as a replacement. Therefore, in a particularly preferred embodiment variant of the invention, in which the synthesis of oligonucleotides is carried out on the basis of phosphoramidites, it is provided that the reagent container receptacle comprises at least six, preferably at least seven reagent containers and that it is arranged in the reagent container receptacle, wherein each of the reagent containers contains one of the following reagents:

one reagent containing phosphoramidites of the bases adenine, guanine, cytosine, thymine or uracil;

one reagent for the detritylation of an end of an oligonucleotide, preferably containing dichloroacetic acid, trichloroacetic acid or zinc bromide;

one reagent for the activation of a detritylated 5'-OH group of an oligonucleotide and for the coupling of the phosphoramidite, preferably containing tetrazole;

one reagent for the oxidation of a phosphite triester, preferably an aqueous iodine solution comprising a weak base, in particular pyridine, lutidine or collidine, or a non-aqueous oxidation agent such as CSO;

preferably at least one reagent for blocking of non-implemented 5'-OH groups of activated oligonucleotides,
preferably acetic anhydride and N-methylimidazole or DMAP;
wherein each reagent container is sealed with a sealing element.

Preferably the reagent container support also includes:
a reagent container containing a reagent for the splitting of the oligonucleotides from a fixed support or for the removal of protective groups of oligonucleotides, preferably an inorganic base or an amine, in particular ammonium hydroxide or methylamine or propylamine, or
at least one reagent container, preferably at least four reagent containers, containing solvent, preferably acetonitrile.

Since the reagent container support is an exchangeable spare part that is necessary for the operation of a device according to the invention, the invention therefore also concerns a reagent container support for loading in a reagent container receptacle of a device according to the invention for the synthesis of oligonucleotides, the reagent container support comprising at least six, preferably at least seven, reagent containers with different reagents, wherein each of the reagent containers contains one of the following reagents:
one reagent containing phosphoramidites of the bases adenine, guanine, cytosine, thymine or uracil;
one reagent for the detritylation of an end of an oligonucleotide, preferably containing dichloroacetic acid, trichloroacetic acid or zinc bromide;
one reagent for the activation of a detritylated 5'-OH group of an oligonucleotide and for the coupling of the phosphoramidite, preferably containing tetrazole;
one reagent for the oxidation of a phosphite triester, preferably an aqueous iodine solution comprising a weak base, in particular pyridine, lutidine or collidine, or a non-aqueous oxidation agent such as CSO;
preferably at least one reagent for blocking non-implemented 5'-OH groups of activated oligonucleotides, preferably acetic anhydride and N-methylimidazole or DMAP;
wherein each reagent container is sealed with a sealing element.

The individual steps of the synthesis and the effect of the individual reagents will be discussed in more detail in a different document section. The quantity of the reagents is however, chosen in such a way that at least one, preferably at least two, in particular three, four or five, synthesis methods can be carried out before the reagent container support has to be replaced.

In order to integrate the microfluid valves efficiently in the fluid connection between the fluid connectors and the synthesis chamber, in a more preferred embodiment variant it is provided that the fluid connection of the microfluid chip comprises one main channel connected to the synthesis chamber and a plurality of fluid connecting channels, wherein each fluid connector is connected to the main channel via one fluid connecting channel and one microfluid valve respectively. It is irrelevant in which position the microfluid valve is arranged in the fluid connecting channel, as an arrangement to one side or in the middle is conceivable for example.

The main channel can for example be arranged in a linear direction. In order to optimally exploit the construction space available and to keep the size of the microfluid chip as small as possible, it is advantageous if the synthesis chamber is arranged in a synthesis channel, and the main channel has at least two branches running parallel to each other, wherein the branches combine in the synthesis channel.

In order to be able to remove the reagents from the synthesis chamber after each individual synthesis step and to create a pressure equalization, it is advantageous if the synthesis chamber, preferably the synthesis channel, is connected to a fluid outlet port designed as an outlet.

In particular, if the main channel has a plurality of parallel branches that combine in the synthesis channel, it is advantageous if a second fluid outlet port designed as an outlet is positioned at the end of at least one of the branches of the main channel. Reagents can be conveyed through the second outlet port in the direction of the second outlet, without the reagents streaming through the synthesis chamber. In particular, such a design is advantageous for the conveying of the reagents to the microfluid valves and the subsequent washing.

In order to facilitate the disposal of the unused reagents or their components it is advantageous if the device includes a waste container, that is attached in the operating position on the at least one as outlet configured fluid outlet ports of the microfluid chip.

In general it is conceivable that the microfluid valves, in particular the membranes of the microfluid valves, are arranged on an exterior surface of the microfluid chip and are attached directly to the control device, in particular to the pneumatic system of the control device.

In a further preferred embodiment variant of the device according to the invention it is provided that the microfluid chip is designed with a plurality of layers and comprises a first support layer with the fluid connectors as well as a second support layer, wherein the second support layer is configured for connection to the control device and the microfluid valves are arranged between the first and the second support layers. The multi-layered design offers on the one hand the high structural stability of the chip. Thus the deformation of the chip that occurs in particular through the clamping between the clamping surfaces in the operating position is minimized. At the same time, the sensitive microfluid valves, in particular the membranes of the sensitive microfluid valves, are protected from damage by both of the support layers.

The actuation of the microfluid valves is achieved particularly simply through the targeted exertion of pressure on the microfluid valve via a pneumatic system. Thereby the microfluid valve is placed under pressure by the pneumatic system in order to switch it from a microfluid to a closed valve position in which the fluid connection is interrupted. If no pressure is exercised on the microfluid valve, the microfluid valve opens and the fluid connection is opened. In principle, the microfluid valves can include blocking elements such as stoppers or lids, however, it is particularly advantageous if the microfluid valves have a membrane as a blocking element.

Therefore, a further particularly preferred embodiment variant of the invention provides that the control device includes a pneumatic system and that the microfluid chip has pneumatic connectors for the connection to the pneumatic system as well as a plurality of connecting channels, wherein each pneumatic connector is attached to a microfluid valve via one pneumatic connecting channel respectively.

Irrespective of whether the microfluid chip has pneumatic connectors and connecting channels or the microfluid valves are directly attached to the pneumatic system of the control device, it is advantageous if the chip receptacle has pneumatic control line channels for connection to the control lines of the pneumatic system of the control device, via which control line channels and control lines the microfluid valves of the chip can be actuated in the operating position via the pneumatic system. Equally, it can be provided that each control line or each control line channel is controllable via a valve that is controlled by means of the control device, wherein the valves are preferably arranged in a valve block. In order to guarantee the necessary impermeability of the connection of the pneumatic system to the microfluid chip for the actuation of the microfluid valve, sealing elements are provided for in a further embodiment variant. Particularly preferably, the sealing elements are arranged in the operating position between the side of the microfluid chip facing away from the fluid connectors and the connecting portion of the chip receptacle with the control line channels. The sealing elements are preferably ring-shaped in order to surround the control line channels with a sealing effect.

At least a part of the reagents necessary for the synthesis of the oligonucleotides must not come into contact with oxygen. Also the majority of the synthesis reactions in the synthesis chamber only take place in an oxygen-free environment. In order to protect both the fluid connection in the microfluid chip as well as the reagent container from oxygen, in particular from the ambient air, in a more preferred embodiment variant of the invention it is provided that the pneumatic system of the control device, or the pneumatic system connected to the pneumatic connecting means is fed with an inert gas, preferably argon. It is advantageous if the device has only one pneumatic system, namely the pneumatic system of the control device, the pneumatic system of the control device is connected in the operating position to the pneumatic connecting means and the pneumatic system contains inert gas.

If upon the actuation of the microfluid valves no exchange between the pneumatic system of the control device and the fluid connection of the chip takes place and the pneumatic system connected to the pneumatic connecting means represents a separate system containing an inert gas, it is however conceivable that the pneumatic system of the control device does not contain an inert gas.

In order to be able to dry the fluid connection of the microfluid chip and the synthesis chamber, it is advantageous if the pneumatic system containing an inert gas of the control device is connected to a fluid connector or a pneumatic connector.

Preferably the device includes a solvent, preferably acetonitrile, containing solvent container, which is connected in the operating position to a fluid connector of the microfluid chip, in order to wash the fluid connection of the microfluid chip.

Since the microfluid chip is a replaceable consumable part which is necessary for the operation of a device according to the invention, but is, however, only designed for a limited number of syntheses, in particular for a single synthesis, the invention therefore only concerns a microfluid chip for a device according to the invention for the synthesis of oligonucleotides, comprising:
 a synthesis chamber for the synthesis of oligonucleotides;
 a plurality of microfluid valves that can be actuated via a control device;
 a plurality of fluid connectors for fluid connecting means for conveying reagents;
 a fluid connection, which connects each fluid connector with the synthesis chamber via a microfluid valve;
wherein the fluid connectors are arranged on one side of the microfluid chip and the microfluid valves are connectable to the control device on a side of the microfluid chip facing away from the fluid connectors,
wherein reagents from one fluid connector can be conveyed in the direction of the synthesis chamber depending on the setting of the valves.

Above said object is also achieved through a method for the operation of a device for the synthesis of oligonucleotides, preferably according to the invention, the device comprising
 a reagent container receptacle on which a reagent container support is arranged, preferably according to the invention, with a plurality of reagent containers filled with reagents;
 a microfluid chip with a synthesis chamber, preferably according to the invention, for the synthesis of oligonucleotides, with microfluid valves and with fluid connectors for the conveying of reagents,
 a control device, in particular comprising a pneumatic system for the control of the microfluid valves; fluid connecting means for the transport of the reagents from the reagent containers to the fluid connectors of the microfluid chip,
wherein the following steps are carried out:
 positioning of the microfluid chip in the device, so that the fluid connectors of the microfluid chip are aligned with the fluid connecting means and the microfluid valves of the microfluid chip are connectable to the control device;
 positioning of the microfluid chip, in particular by means of a moveable chip receptacle via the actuator device, until a connection is established between the fluid connectors of the microfluid chip and the fluid connecting means;
 connection of the microfluid valves to the control device, in particular to the pneumatic system of the control device;
 positioning of the reagent container receptacle, in particular by means of the actuator device, until a connection between the reagent containers and the fluid connectors of the microfluid chip is created via the fluid connecting means, so that reagents from the reagent containers can be conveyed in the direction of the synthesis chamber depending on the valve setting of the microfluid valve.

For the description of the construction of the device according to the invention, reference is made to the above description, for the sake of clarity, so that in the following only the method steps are explained in more detail.

The method starts with the loading position in which no microfluid chip is placed in the device and no reagent container support is arranged in the reagent container receptacle. In a first step, a reagent container support is arranged in the reagent container receptacle and preferably set up in such a way that the fluid connecting means, in particular the, preferably needle-like, transport lines are aligned with the reagent containers.

Then a microfluid chip is placed in the device and positioned in such a way that its fluid connectors are aligned with the fluid connecting means, in particular to the connection pieces. This positioning can be achieved, for example, by the microfluid chip being placed in a chip receptacle that is oriented in direction to the fluid connecting means. Equally, the positioning can be carried out in such a way that the chip is placed in a loading tray in the chip receptacle and the loading tray is pushed from the loading position, in which the fluid connectors of the microfluid chip is not aligned with the connecting means, along a shifting direction, until the fluid connectors of the microfluid chip is arranged in an intermediate position. For the positioning of the loading tray a limit stop can be provided. In order to fix the loading tray in the intermediate position, provision can be made for a locking mechanism.

In a further step the microfluid chip is connected to the fluid connecting means, by moving the microfluid chip in the device. Preferably the microfluid chip is arranged in the chip receptacle and the chip receptacle together with the microfluid chip is moved or driven in the device. Particularly preferably the chip receptacle is moved by means of the actuator device along a linear movement axis in the direction of the fluid connecting means. The fluid connecting means can be firmly fixed to a support plate, for example.

The connection of the microfluid valves to the control device can, for example, be carried out with a connector portion, which is connected in particular to the pneumatic system of the control device, which connector portion is moved, preferably by means of the actuator device, in the direction of the microfluid chip or is connected to the microfluid chip together with the fluid connecting means.

Preferably the chip receptacle comprises the connector portion for the connection of the control device to the microfluid valves of the microfluid chip. In this case it can be provided that the chip receptacle is moveable relative to the microfluid chip, as soon as the fluid connectors are supported on the fluid connecting means fixed onto the support plate. The chip receptacle can in this case be pushed further in the direction of the fluid connecting means, until the microfluid chip is clamped between the fluid connecting means and the connector portion. In other words, the microfluid chip remains stationary as it lies on the fluid connectors, while the chip receptacle continues to be movable in the direction of the support plate. Particularly preferably, the connector portion displays sealing elements and conveying lines for the pneumatic system of the control device, wherein the microfluid chip is clamped between the sealing elements and the connection pieces of the fluid connecting means.

In a further step the reagent containers are attached to the fluid connecting means, wherein the reagent container receptacle together with the reagent containers is moved in the direction of the fluid connecting means. Preferably the movement is made via the actuator device along the linear movement axis. In particular, the locking elements of the reagent containers are penetrated by the fluid connecting means, in particular by the needle-like transport lines, by the movement of the reagent container receptacle, so that the ends of the fluid connecting means each end up in one reagent container respectively.

While it is advantageous if the steps of alignment, connection of the fluid connecting means, connection of the control device and connection of the reagent containers are carried out in this order, the individual steps are interchangeable in alternative embodiment variants. For example, the reagent containers can remain attached for a plurality of syntheses, while for each synthesis the microfluid chip is changed and the steps necessary for this are carried out.

As soon as the microfluid chip is attached to the fluid connecting means and the control device, in particular to the pneumatic system of the control device, and the fluid connecting means connect the reagent containers of the reagent container receptacle with the microfluid chip, the device is in the operating position in which the synthesis of the oligonucleotides is carried out by the controlled conveying of the reagents by the microfluid valves into the synthesis chamber.

Generally, a wide range of different technical options for the conveying of the reagents out of the reagent containers via the fluid connecting means in the direction of the microfluid chip are conceivable, for example pump systems or piston systems.

One preferred embodiment variant of the invention provides that the reagent containers are connected to a pneumatic system, in particular to the pneumatic system of the control device, preferably via pneumatic connecting means, and that reagents are transported out of the reagent containers in the direction of the synthesis chamber via the gas pressure of the pneumatic system. By the conveying of the reagents by means of the gas pressure of the pneumatic system, the number of mechanically moveable elements is reduced, which results in less wear and tear and less susceptibility to errors. It is particularly preferred if the system comprises only the pneumatic system of the control device, which serves both for the actuation of the microfluid valves as well as for the conveying of the reagents. The pneumatic connecting means are preferably arranged parallel to the fluid connecting means in this, so that with the movement the ends of the pneumatic connecting means also penetrate the sealing elements of the reagent containers and the respective ends are arranged in one of the reagent containers.

In a further preferred embodiment variant of the method according to the invention it is provided that the microfluid chip has at least one fluid outlet connector designed as an outlet, preferably two fluid outlet connectors designed as an outlet, and that the microfluid valves are actuated individually via the control device, in order to convey one reagent from one fluid connector connected to a reagent container in the direction of the at least one outlet connector designed as an outlet, wherein the corresponding microfluid valves, which control both the fluid connectors, are opened. The conveying of one reagent is thus carried out via the simultaneous opening of the microfluid valve that controls the corresponding fluid connector of the reagent and of the microfluid valve that controls one of the outlet connectors. The remaining microfluid valves are usually closed during the conveying. Thus the reagent flows from the fluid connector via the fluid connection, in particular via one transport channel and the main channel, to the outlet connector, that is preferably connected to a waste container. One of the outlet connectors is located in direction of flow after the synthesis chamber, in order to facilitate the flow through the synthesis chamber with reagent.

It is however advantageous, if the microfluid chip has at least two, preferably precisely two, outlet connectors designed as an outlet, whereby at least one of the outlet connectors is located in direction of flow after the synthesis chamber and at least one of the outlet connectors is arranged in such a way that the reagents do not flow through the synthesis chamber upon the opening of the allocated valve.

During the synthesis process, the reagents are conveyed in small quantities into the synthesis chamber via the control by the microfluid valve. For the performance of the synthesis it is therefore necessary to create a general exit state, in which without notable dilation, preferably directly, through the release of the microfluid valve, reagents flow via the fluid connection in the direction of the synthesis chamber. Therefore it is necessary to lead the reagents to the microfluid valve, once the device has been brought into the operating position. For this purpose, a microfluid valve that controls a fluid supply for a reagent from a reagent container, is opened, so that reagent from the reagent container flows via the corresponding fluid connecting means, the fluid connector, to the microfluid valve. As a rule, the reagent flows through the microfluid valve so that part of the reagent is found in the main channel of the fluid connection. The duration of opening of the microfluid valve is stored in the control device and can be interpreted, taking into account the gas pressure, the conveying path of the fluid connecting means, the diameter of the fluid connecting means or the viscosity of the reagent.

In order to prevent any reagent that has flowed through the microfluid valve remains in the main channel after the conveying, the microfluid chip or the fluid connection is subsequently flushed through with solvent, preferably acetonitrile, wherein the corresponding microfluid valve is opened that controls the fluid connector that is connected to the solvent, preferably with the solvent container. In a further step the miocrofluid chip or the fluid connection is dried, in order to remove any remains of the solvent. In this the microfluid valve is opened, which facilitates the supply of inert gas. Preferably the inert gas comes from a pneumatic system in the control device.

Preferably, the connectors for the solvent and for the inert gas are arranged in the fluid connecting means in such a way that all the other fluid connecting means are arranged in direction of flow after both of the previously mentioned connectors. Thus it is guaranteed that all the areas of the fluid connection can be flushed through in the cleaning and drying and all the reagents can be removed.

These steps are repeated for each reagent container that contains a reagent necessary for the synthesis. Therefore a particularly preferred embodiment variant of the method according to the invention is provided, in that before the start of the synthesis of an oligonucleotide the following steps are carried out:
  opening of a microfluid valve that controls a fluid connector for the conveying of reagent from a reagent container;
  closing of the opened a microfluid valve, when reagent is flowing through the microfluid valve;
  washing of the microfluid chip, preferably of a main channel of the microfluid chip, by opening a microfluid valve that controls a fluid connector for the conveying of a solvent, preferably acetonitrile;
  preferably drying of the microfluid chip, in particular of a main channel of the microfluid chip, by opening one of the microfluid valves that controls the conveying of an inert gas, preferably argon;
  repeating of the previous steps until each reagent from the reagent containers connected to the fluid connectors of the microfluid chip has been conveyed to the respective microfluid valve of the respective fluid connector.

Following the end of a synthesis, the reagents, by opening the corresponding microfluid valves, and preferably the simultaneous opening of the microfluid valve that controls the conveying of an inert gas, preferably argon, are conveyed back from the microfluid chip and the transport lines of the fluid connecting means into the reagent container. Subsequently, the steps described at the beginning for the operation can be carried out in reverse order, in order to bring the device back into the loading position.

In order to prevent reagents from entering the synthesis chamber when conveying the reagents as well as when washing and drying the fluid connection, and a reaction from taking place there, it is advantageous, if that microfluid valve is opened which controls the specific outlet connectors, with which the reagents do not flow through the synthesis chamber. In other words, the respective outlet connectors that is located in direction of flow after the synthesis chamber is not released.

In the following only the synthesis steps of a synthesis cycle shall be discussed, that are necessary for the coupling of a nucleotide to the end of a subsequence of an oligonucleotide or as the first nucleotide in a linker molecule of a carrier medium. The sequence of the synthesis steps and the reagents used for this are known in themselves. It is therefore self-evident that in the synthesis chamber a plurality of oligonucleotides of the same nucleotide sequence are synthesizable at the same time. Each oligonucleotide starts with a linker molecule of a carrier medium and is increased by one nucleotide with each synthesis step, which is linked to the end of the chain. The 5'-OH group of the oligonucleotide is equipped with an acid-labile dimethoxytrityl protecting group (4,4'- dimethoxytrityl—DMT).

First of all, a reagent for the detritylation of one end of one of the oligonucleotides exhibiting a subsequence or for the detritylation of a linker molecule is conveyed to the synthesis chamber from the reagent container. Through this the DMT protecting group is removed, so that a further nucleotide can be linked to the free 5'-OH group. In the case of the reagent for detritylation, this can be an acid solution. For example, a solution containing 2% trichloroacetic acid or 3% dichloroacetic acid in an inert solvent such as acetonitrile, dichloromethane or toluol is conceivable. This step is also called the deblocking step.

In the next step the nucleotide chain on the detritylated, free 5'-OH group, is extended by one nucleotide, i.e. either adenine, guanine, cytosine or thymine for a DNA strand or adenine, guanine, cytosine or uracil for an RNA strand. For this a reagent for the activation of the free 5'-OH group and a reagent containing phosphoramidites is alternately conveyed to the synthesis chamber. The phosphoramidites are conveyed dissolved in a solvent, in particular acetonitrile. The activation of the free 5'-OH group can, for example, be achieved by means of a 0,2-0,7 molar solution of an acid azole catalyst, in particular through 1H-tetrazole, 5-ethylthio-1H-tetrazole, 2-benzylthio tetrazole or 4,5-dicyanoimidazole. Thereby the nucleotide couples with the free 5'-OH group of the oligonucleotide, while the phosphoramidite residue is split. The 5'-OH group of the newly coupled nucleotide is once again protected by a DMT protecting group. This step is also called the coupling step.

In an advantageous manner, in the next step, a reagent for blocking the non-used 5'-OH group is conveyed to the synthesis chamber. Since in the previous step 0.1% to 1% of the free 5'-OH group of the individual oligonucleotide strand is usually not used, in the case of the continuation of the synthesis, oligonucleotides with deletion mutations would form, which differ only minimally from the oligonucleotides to be synthesized and are difficult to filter out. However, if the non-used 5'-OH group is blocked out, as a rule with acetylation, the chain building is permanently interrupted and the interrupted oligonucleotides display as a rule a considerably shorter length than the oligonucleotides to be synthesized. Through this the interrupted oligonucleotides can be removed from the product of the synthesis simply and easily. For example, the blocking of non-used 5'-OH groups is achieved through a mixture of acetate anhydride, 1-methylimidazole or 4-dimethylaminopyridine (DMAP) as catalyst. This step is also called the capping step.

In the last step in a synthesis cycle the oxidation of a phosphite triester coupling that is formed from the newly coupled nucleotide and the corresponding 5'-OH group of the oligonucleotide is carried out. The reagent oxidizes the phosphite triester bond in a fourfold coordinated phosphite triester, a protected forerunner of the naturally occurring phosphate diester internucleotide linkage. Thus the bond between the linked nucleotide and the corresponding 5'-OH group is stabilized. For the oxidation, an aqueous iodine solution for example, comprising a weak base, in particular pyridine, lutidine or collidine, can be used or under anhydrous conditions by means of (1S)-(+)-(10-camphorsulfonyl)-oxaziridine (CSO) or tert-butyl hydroperoxide (TBHP). This step is called the oxidation step.

The three, preferably four, steps in a synthesis cycle are repeated in the order of the nucleotide sequence of the oligonucleotides to be synthesized as often as required until the oligonucleotide presents the predetermined length and sequence.

Therefore, in a particularly preferred embodiment variant of the method according to the invention it is provided that for the synthesis of an oligonucleotide, preferably of a DNA strand, the following steps are carried out: opening of a microfluid valve that controls a fluid connector for the conveying of a reagent for the detritylation of a 5'-OH group provided with a dimethoxytrityl protecting group of the oligonucleotide or for the detritylation of a linker molecule of a carrier medium from a reagent container;
  alternate opening of a microfluid valve, that controls a fluid connector for the conveying of a reagent for the activation of the detritylated 5'-OH group from a reagent container and a microfluid valve, that controls the fluid connector for the conveying of a reagent containing phosphoramidites of the bases adenine, guanine, cytosine, thymine or uracil from a reagent container;
  preferably opening of at least one of the microfluid valves, that controls the fluid connector for the conveying of a reagent for the blocking of non-used 5'-OH groups from a reagent container;
  opening of a microfluid valve that controls the fluid connector for the conveying of a reagent for the oxidation of a phosphite triester coupling from a reagent container;
  repeating of the previous steps.

Preferably, the microfluid chip or the fluid connection is washed or dried after each step in the synthesis cycle as described above. It is particularly preferable in this, if during the washing and drying the microfluid valves of all the fluid outlet connectors designed as an outlet are alternately opened and closed, wherein as a rule just one of the relative microfluid valves is simultaneously opened.

Following the conclusion of the synthesis, different procedures are conceivable: on the one hand the device can, as described previously, be returned to the loading position and the microfluid chip containing the synthesized oligonucleotide removed. In a separate step, the synthesized oligonucleotide is removed from the synthesis chamber and separated from the linker molecule and the protection groups are removed.

It is, however, advantageous if the removal of the protecting groups and the release of the oligonucleotide from the linker molecules of the carrier medium are carried out while still in the operating position and the synthesized oligonucleotide as end product can be removed from a product collection container in the device. Therefore, in a further preferred embodiment variant of the invention it is provided that after the conclusion of the synthesis the following step is carried out:
  opening of at least one of the microfluid valves that controls a fluid connector for the conveying of a reagent to the splitting of the oligonucleotides from the linker module or a reagent for the removal of the protecting groups
  simultaneous opening of a microfluid valve that controls a fluid connector for a product collection container.
  This step is known as cleavage/deprotection.

Preferably two fluid connectors for the conveying of a reagent for the splitting of the oligonucleotides from the linker molecule or a reagent for the removal of the protecting groups are provided, wherein one of the connectors is arranged in the direction of the flow before the synthesis chamber and the other in the direction of the flow after the synthesis chamber. This means that the cleaning volumes can be increased.

BRIEF DESCRIPTION OF THE FIGURES

The invention will now be explained in more detail with the help of embodiments. The drawings are examples and are intended to illustrate the idea behind the invention, but in no way restrict it or attempt to reproduce a definitive version.

In particular:

FIG. 5 shows a frontal view of the device in the operating position;

FIG. 6 shows a sectional view of the device according to line AA in FIG. 5;

FIG. 8 shows an enlarged detailed view of the device according to area C in FIG. 7;

FIG. 9 shows an enlarged detailed view of the device according to area C in FIG. 7 in the intermediate position;

DETAILED DESCRIPTION OF EXEMPLARY EMBODIMENTS OF THE INVENTION

Figure 1:
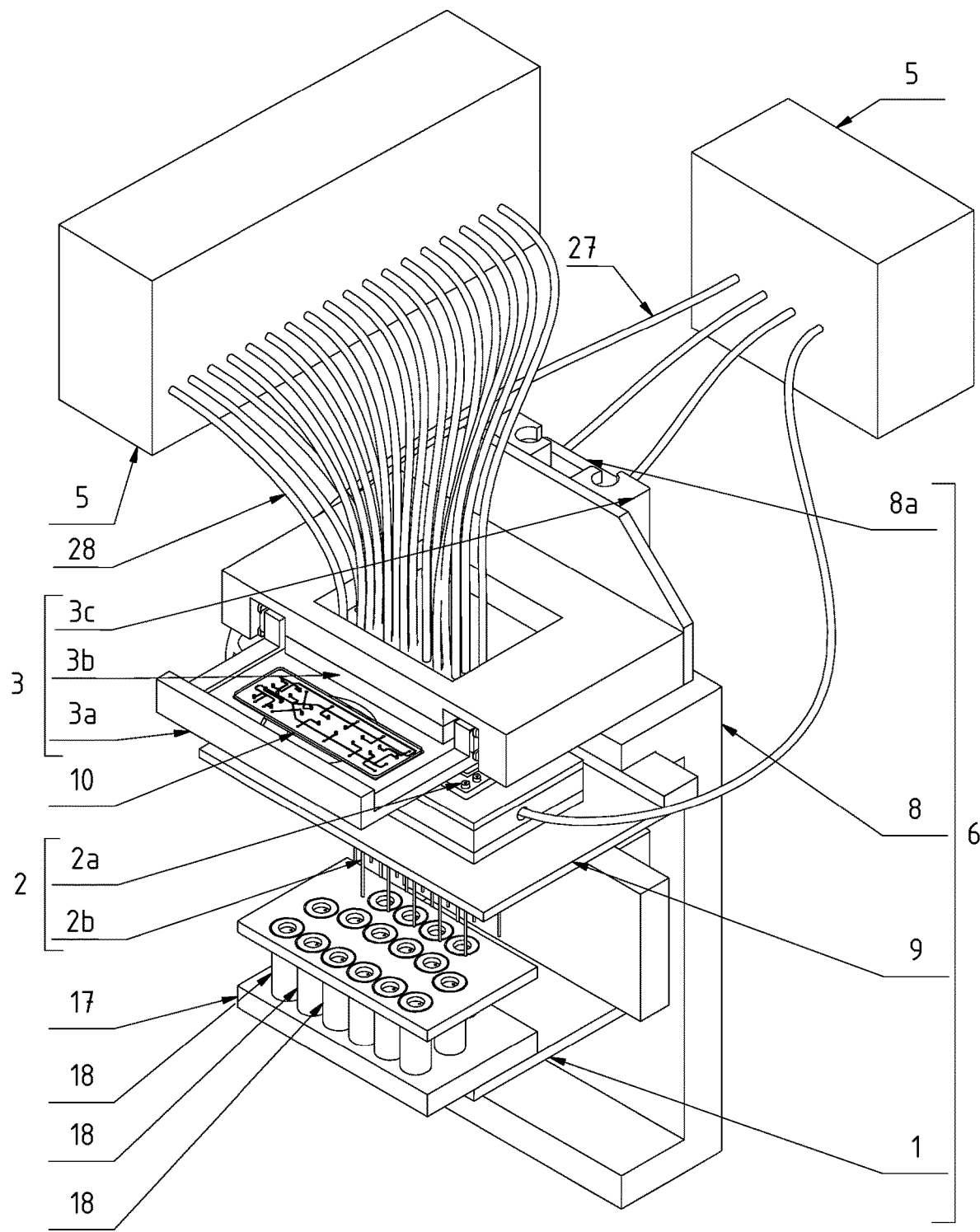
FIG. 1 shows a three dimensional view of a device according to the invention for the synthesis of oligonucleotides in a loading position.

FIG. 1 shows a first embodiment variant of a device according to the invention for the synthesis of oligonucleotides in a loading position. In this embodiment the device comprises a reagent container receptacle 1, a chip receptacle 3 as well as a rack 8 and a support plate 9. Between the chip receptacle 3 and the reagent container receptacle 1 there are fluid connecting means 2 that are connected to the support plate 9.

In the illustrated loading position, the reagent container receptacle 1 can be loaded with a reagent container support 17 that comprises multiple connected reagent containers 18 as a unit for the synthesis of the oligonucleotides. In the loading position illustrated, the reagent containers 18 are not permanently attached to the device, so that the reagent container support 17 is removable from the reagent container receptacle 1 or can be inserted into the reagent container receptacle 1 (see FIGS. 2 and 3). In other words, the reagent container support 17 is replaceable in the loading position by a similarly constructed reagent container support 17 acting as a spare part.

Figure 10:
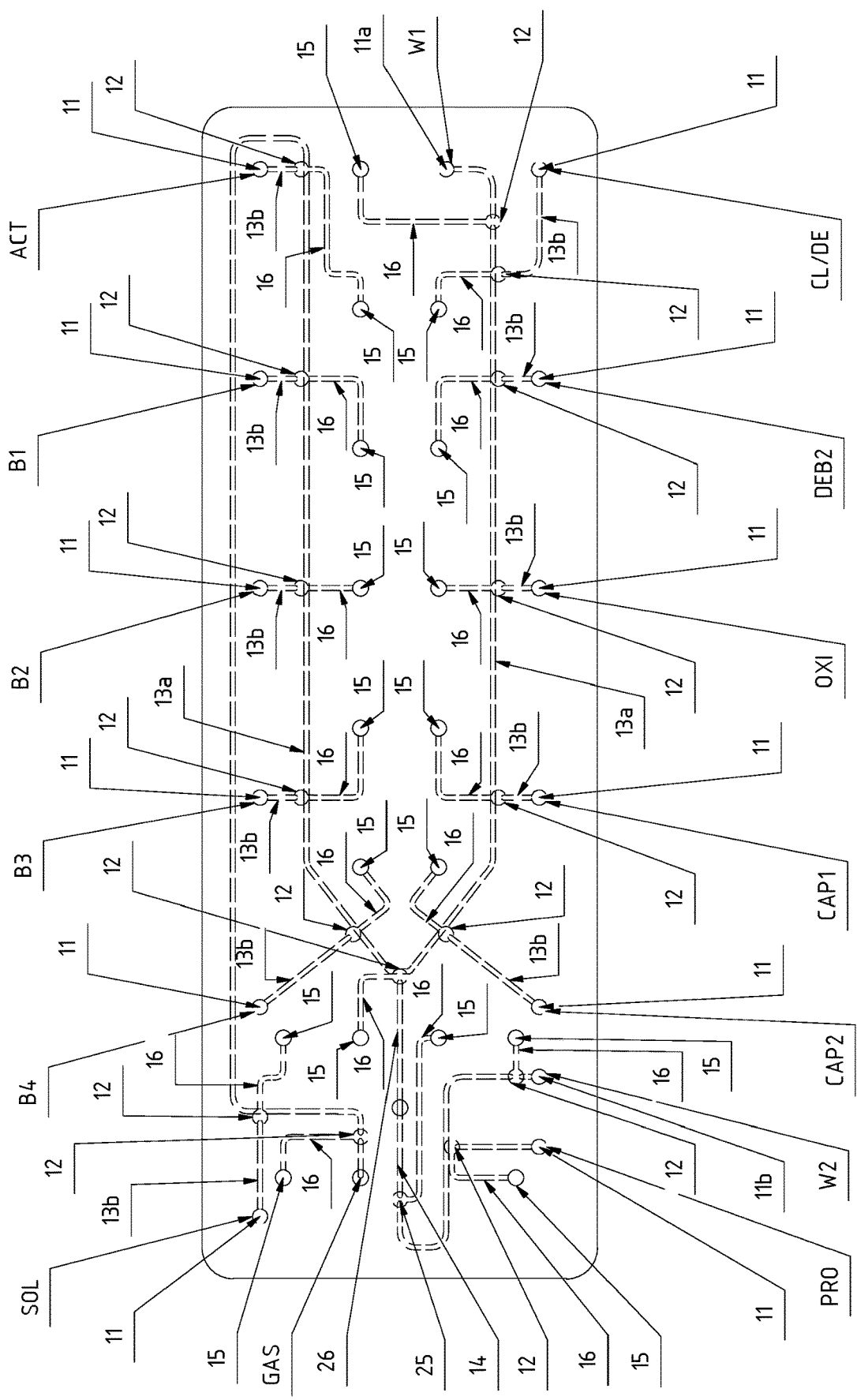
FIG. 10 shows the layout of a first embodiment variant of a microfluid chip according to the invention.
Figure 13:
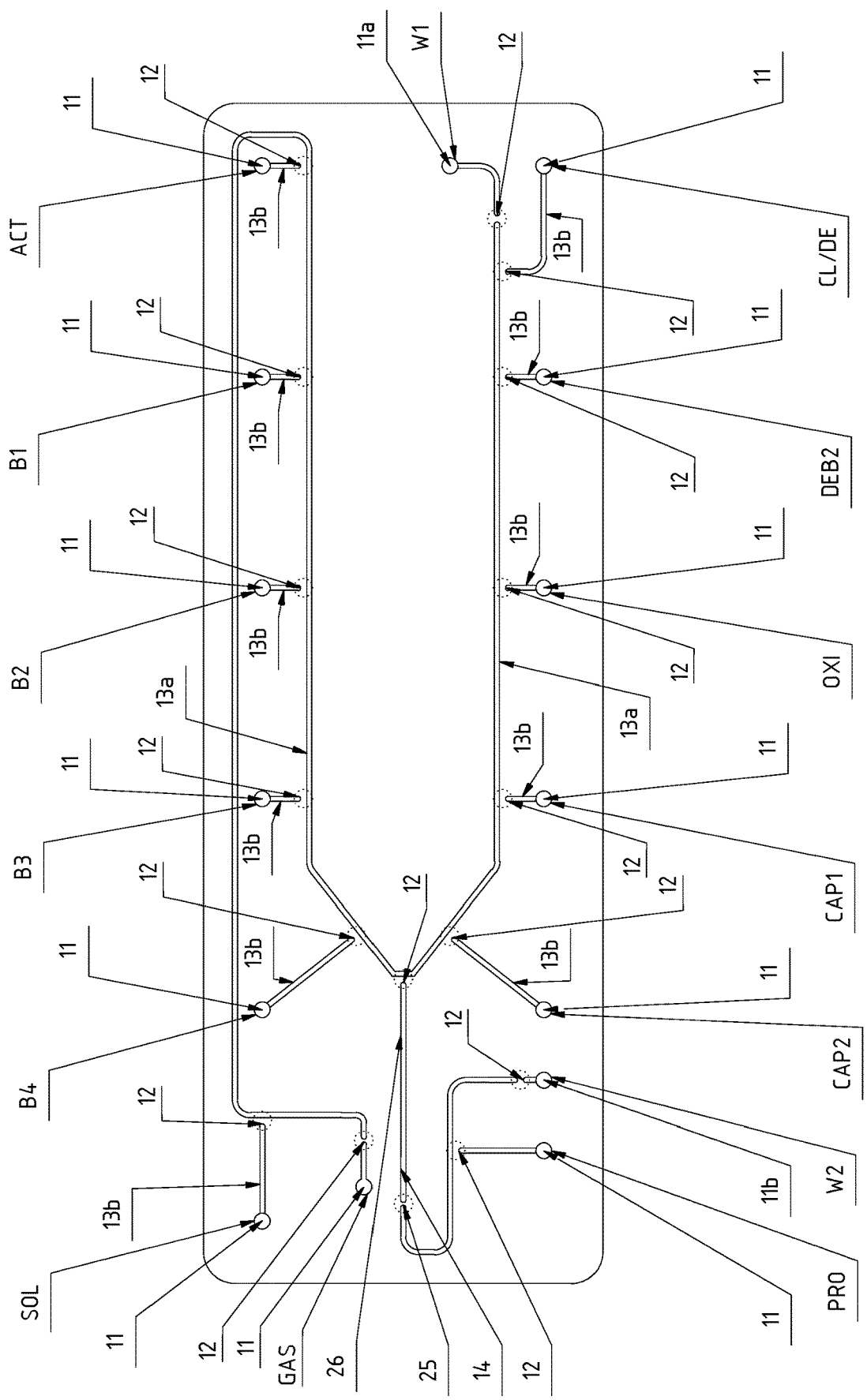
FIG. 13 shows the layout of a second embodiment variant of the microfluid chip according to the invention.

In the illustrated loading position, the chip receptacle 3 can be loaded with a microfluid chip 10 made of plastics material, which microfluid chip 10 has a synthesis chamber 14, in which the synthesis of the oligonucleotides takes place (see FIGS. 10 and 13). As can be seen clearly from the figure, the microfluid chip 10 is not permanently attached to the device in the loading position, so that the microfluid chip 10 can be inserted in the device or can be removed from the device. In other words, the microfluid chip 10 is replaceable in the loading position by a similarly constructed microfluid chip 10 acting as a spare part. In this embodiment the chip receptacle 3 a drawer-like, removable receptacle compartment 3a, in which the microfluid chip 10 can be placed.

As illustrated in particular in the FIGS. 7 to 13, the microfluid chip 10 has on the one side a plurality of fluid connectors 11. The fluid connectors 11 can be combined with the fluid connecting means 2, which fluid connecting means 2 in an operating position (see in particular FIGS. 4, 7 and 11) each connect a reagent container 18 with a fluid connector 11 of the microfluid chip 10, so that reagents are conveyable from the reagent containers 18 in the direction of the synthesis chamber 14. The fluid connecting means 2 are arranged between the chip receptacle 3 and the reagent container receptacle 1.

In addition to the fluid connectors 11, the microfluid chip 10 has microfluid valves 12, which can be controlled via a schematically illustrated control device 5. The microfluid valves 12 of the microfluid chip 10 can be connected to the control device 5, wherein the microfluid valves 12 in the operating position are each connected to one control line 28 on the control device 5. In this embodiment the microfluid valves 12 on one of the fluid connectors 11 on the opposite side of the microfluid chip 10 are connectible to the control device 5.

In order to be able to connect the microfluid valves 12 to the control device 5, the chip receptacle 3 has a connector portion 3b, which, in the operating position, connects the control device 5 to the microfluid chip 10.

In order to bring the microfluid chip 10 together with the chip receptacle 3, the reagent container receptacle 1 and the fluid connecting means 2 from the loading position into the operating position, in this embodiment of the device an actuator device 6 is provided, which comprises the rack 8 and a track 8a fixed to the rack 8. The support plate 9 is fixed firmly to the rack 8 in this, while the chip receptacle 3 and the reagent container receptacle 1 are fixed in a translationally moveable manner along track 8a. Each of the fluid connecting means 2 comprises one connector piece 2a for connection to the fluid connectors 11 of the microfluid chip 10 and a needle-like transport line 2b for the transport of the reagents from the reagent container 18. The actuator device 6 comprises preferably at least one electrical power unit, for example an electric motor or a linear motor and or a spindle drive.

Figure 4:
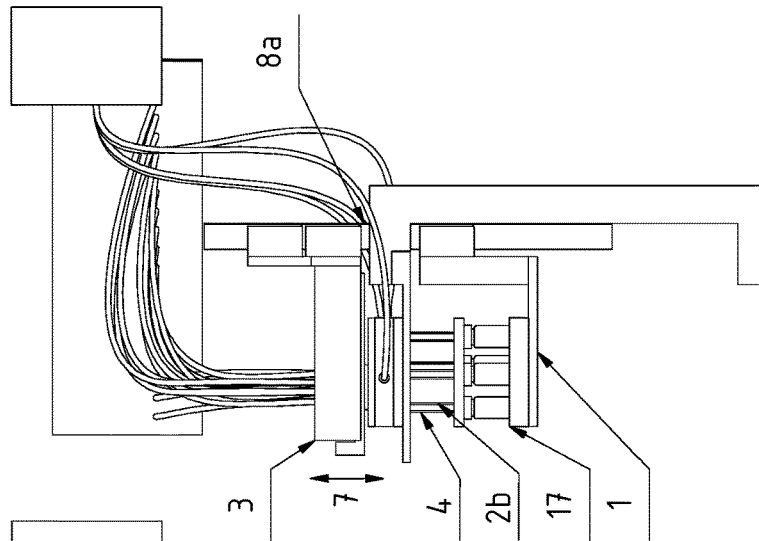
FIG. 4 Side view of the device in an operating position
Figure 3:
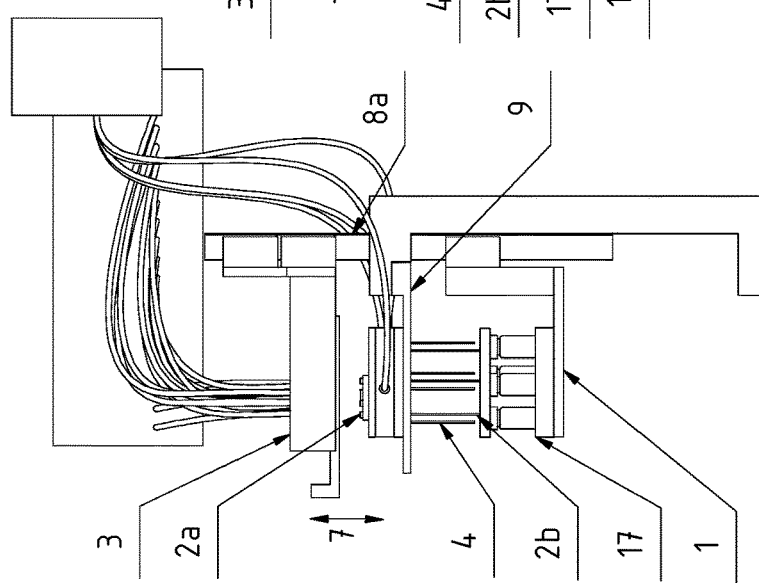
FIG. 3 shows a side view of the device in an intermediate position
Figure 2:
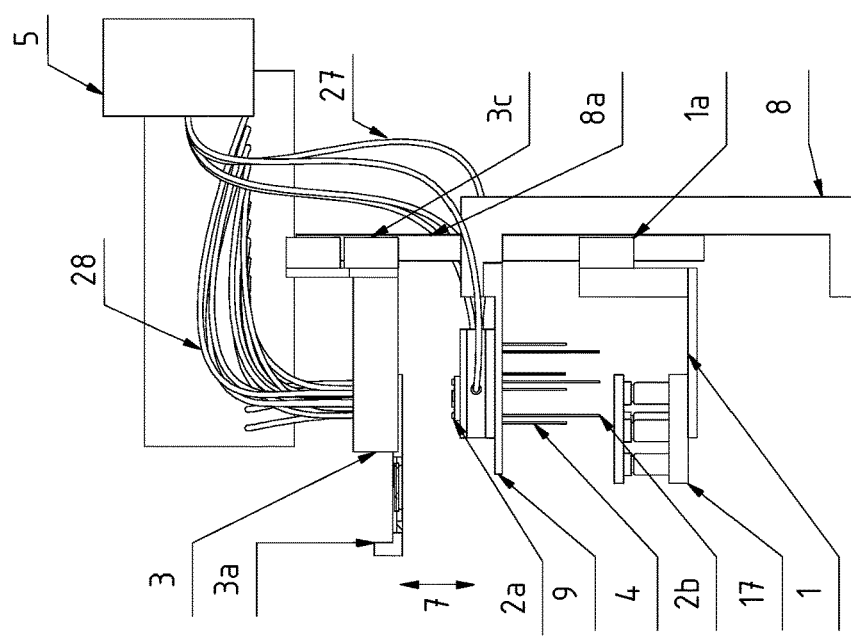
FIG. 2 shows a side view of the device in the loading position.

The FIGS. 2 to 4 show the motion sequence of the device from the loading position to the operating position.

In FIG. 2 the receptacle compartment 3a is extended and the microfluid chip 10 is placed in the receptacle compartment 3a. The receptacle compartment 3a is opened in the direction of the fluid connecting means 2, whereby the microfluid chip 10 is lying in a peripheral area in the receptacle compartment 3a. Thereby the microfluid chip 10 can preferably only be inserted in one direction in the receptacle compartment 3a and is fixed in position in receptacle compartment 3a. The chip receptacle 3 has a connecting portion 3c, with which the chip receptacle 3 is connected to the track 8a. Furthermore it is illustrated how a reagent container support 17 is positioned in the reagent container receptacle 1. Thereby it is advantageous if the reagent container receptacle 1 has positioning aids, such as positioning lugs, tracks or stops, in order to ensure that the reagent container support 17 can only be inserted in one direction in the reagent container receptacle 1 or that the reagent container support 17 is separable simply and easily in a predefined relative position with respect to the fluid connecting means 2 applied. The reagent container receptacle 1 also has a connecting portion 1a with which the reagent container receptacle 1 is connected to the track 8a.

The actuator device 6 facilitates the positioning of the chip receptacle 3, the reagent container receptacle 1 and the fluid connecting means 2 along a linear movement axis 7. In this embodiment this is achieved by aligning the track 8a parallel to the movement axis 7.

In this embodiment the conveying of the reagents is achieved via gas pressure that originates from a pneumatic system. The gas in the pneumatic system is an inert gas, wherein in this embodiment argon is used. In order to connect the reagent container 18 with the pneumatic system, pneumatic connecting means 4 are provided, which are each configured as a needle-like transport line. The pneumatic connecting means 4 are, preferably running parallel to the fluid connecting means 2, firmly secured to the support plate 9.

In FIG. 3 an intermediate position is shown in which the drawer-like receptacle compartment 3a is pushed closed in the chip receptacle 3, wherein the insertion direction is normal to the linear movement axis 7. Thereby the fluid connectors 11 of the microfluid chip 10 inserted in the receptacle compartment 3a are aligned to the fluid connecting means 2, more precisely to their connector pieces 2a, so that in the case of a shift in the chip receptacle 3 along the movement axis 7 in the direction of the support plate 9 a connection between the fluid connectors 11 and the fluid connecting means 2, more precisely to their connector pieces 2a, can be created.

The reagent container support 17 is positioned in the reagent container receptacle 1 in such a way that the individual reagent containers 18 are aligned on the one hand to the fluid connecting means 2, in particular to their transport lines 2b, and on the other hand are aligned to the pneumatic connecting means 4 configured as transport lines, so that in the case of a shift in the reagent container receptacle 1 along the movement axis 7 in the direction of the support plate 9 a connection between the connecting means 2, more precisely to their transport lines 2b, and the reagent containers 18 as well as between the pneumatic connecting means 4 and the reagent containers 18 can be created.

If the positions of the reagent container receptacle 1 and the chip receptacle 3 in the figure is compared with that in FIG. 4, it can be seen that both the reagent container receptacle 1 as well as the chip receptacle 3 have already been pushed in the direction of support plate 9.

Figure 7:
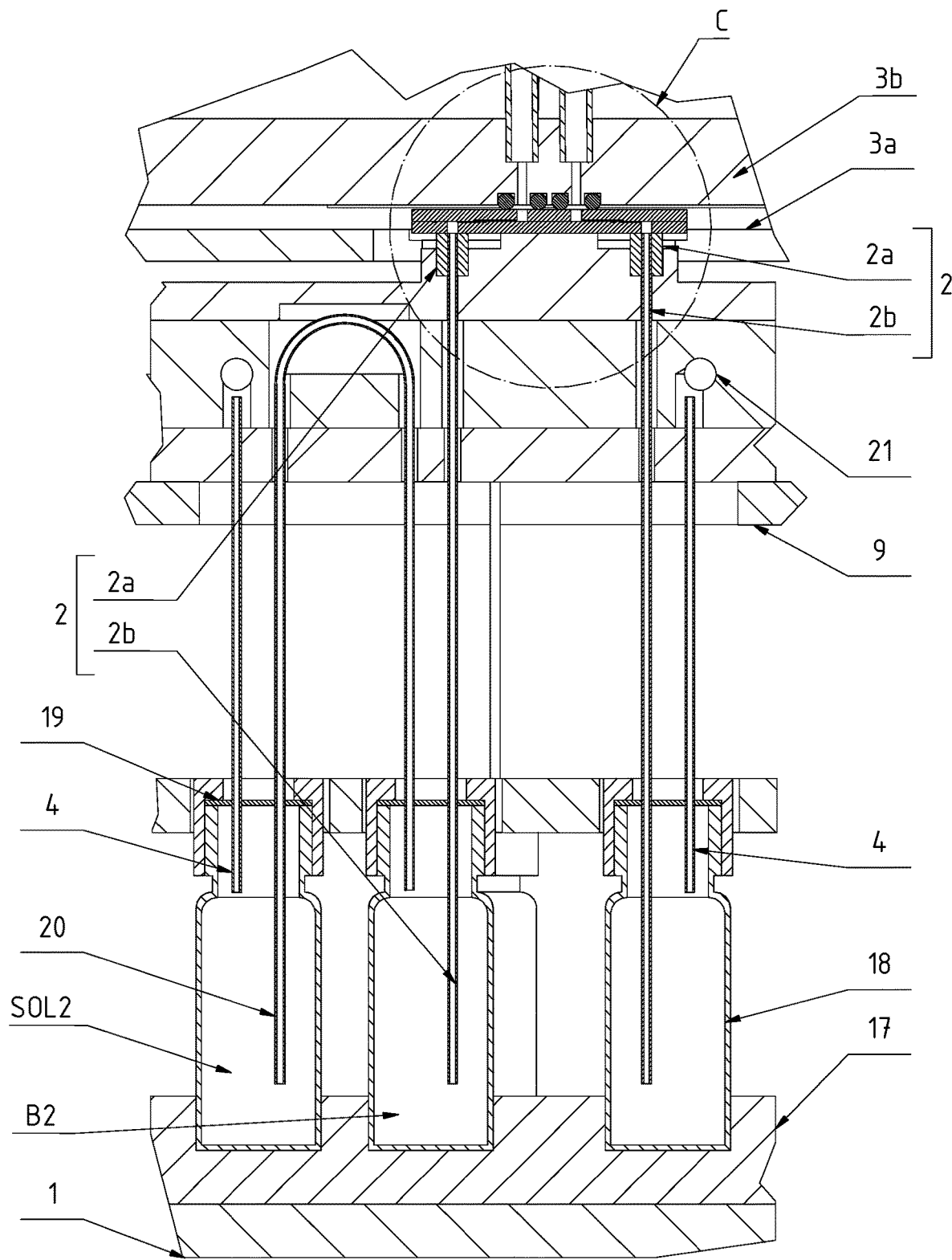
FIG. 7 shows an enlarged detailed view of the device according to area B in FIG. 6.

FIG. 4 now shows the operating position of the device in which the fluid connectors 11 of the microfluid chip 10 are connected to the connector pieces 2a of the fluid connecting means 2 and one end of a respective transport line 2b of a fluid connecting means 2 and one end of a pneumatic connecting means 4 are found within a reagent container 18 (see in particular FIGS. 6 and 7). The reagent container receptacle 1 and the chip receptacle 3 run along the track 8a in the direction of the linear movement axis 7 in a maximum position.

In FIG. 5 the frontal view of the device is illustrated, which shows in particular, that the reagent container support 17 has several rows of reagent containers 18. Thereby the fluid connecting means 2 and the pneumatic connecting means 4 are positioned behind each other in the selected view.

FIG. 6 now shows a sectional view of the device in the operating position, wherein on the one hand the connection of the microfluid chip 10 to the fluid connecting means 2 as well as to the control device 5 are visible and on the other hand the connection of the pneumatic 4 and the fluid connecting means 2 with the reagent containers 18.

While the connection of the microfluid chip 10 based on the FIGS. 8 and 9 have been explained in detail, the mechanism for the transport of the reagents in the direction of the microfluid chip 10 shall be discussed based on FIG. 7.

The support plate 9 has a plurality of gas line channels 21, through which the pneumatic connecting means 4 are connected to the gas lines 27 of the pneumatic system. In the present embodiment the pneumatic connecting means 4 are configured as transport lines, which are stuck onto or pressed into openings in the support plate 9. In order to control the conveying of the reagents, the gas line channels 21 are controllable via at least one conveying valve, which can release or block the connection of the gas line channels 21 with the gas lines 27 of the pneumatic system. Preferably for each pneumatic connecting means 4 or for each gas line 27 a dedicated conveying valve is provided.

Only fluid reagents can be conveyed in the direction of the microfluid chip 10 via the fluid connecting means 2. The reagent container 18 illustrated to the far right of the figure contains a fluid reagent. As illustrated, the end of the transport line 2b of the fluid connecting means 2 facing away from the microfluid chip 10 is positioned in the reagent container 18. Thereby the transport line 2b of the fluid connecting means 2 penetrates a sealing element 19 of the reagent container 18 during the positioning of the reagent container receptacle 1. The end of the transport line 2b of the fluid connecting means 2 is positioned in this in the bottom area of the reagent container 18 and thus in other words is immersed in the reagent. The connector piece 2a of the fluid connecting means 2 is attached to the side of the support plate 9 facing away from the reagent container 18, so that the transport line 2b of the fluid connecting means 2 pass through the support plate 9.

In analogy to the fluid connecting means 2 the end of the pneumatic connecting means 4 configured as a transport line facing opposite to the support plate 9 is positioned in the reagent container 18. Thereby a needle-like end of the pneumatic connecting means 4 also penetrates the sealing element 19 of the reagent container 18 during the positioning of the reagent container receptacle 1. Thereby, the end of the pneumatic connecting means 4 is positioned in an area of the reagent container 18 facing opposite to the bottom area.

Through the sealing element 19 a closed volume is formed within the reagent container 18. When the gas pressure in the reagent container 18 is increased by the gas supply via the pneumatic connecting means 4, the liquid reagent is conveyed in the direction of the microfluid chip 10 via the transport line 2b of the fluid connecting means 2.

Certain reagents cannot be kept in liquid form for a long time since they lose their reactivity. In this case a pair of reagent containers 18 are provided, wherein one of the reagent containers 18 contains a solvent SOL1, SOL2, SOL3, SOL4 and the other reagent container 18 a solid to be dissolved. In this exemplary embodiment the solvent is acetonitrile and the solid is phosphoramidite of the bases adenine B1, guanine B2, cytosine B3, thymine or uracil B4.

The fluid connecting means 2 are configured in analogy to the fluid connecting means 2 described above, wherein the end of the transport line 2b of the fluid connecting means 2 is arranged in the reagent container 18 holding the phosphoramidite B1, B2, B3, B4 in powder form. The pneumatic connecting means 4 are also configured in analogy to the pneumatic connecting means 4 described above, however the end of the pneumatic connecting means 4 is arranged in the reagent container 18 holding the solvent SOL1, SOL2, SOL3, SOL4. The reagent container 18 holding the phosphoramidite B1, B2, B3, B4 in powder form is connected to the reagent container 18 holding the solvent SOL1, SOL2, SOL3, SOL4 by one of the fixed connecting lines 20 in the support plate 9. When the gas pressure in the reagent container 18 holding the solvent SOL1, SOL2, SOL3, SOL4 is increased by conveying of gas via the pneumatic connecting means 4, the solvent SOL1, SOL2, SOL3, SOL4 is transferred to the reagent container 18 holding the phosphoramidite B1, B2, B3, B4 in powder form via the connecting line 20 where the phosphoramidite B1, B2, B3, B4 in powder form is dissolved in the solvent SOL1, SOL2, SOL3, SOL4. As soon as all of the solvent SOL1, SOL2, SOL3, SOL4 has been transferred, gas flows over the connecting line 20 in the reagent container 18 now containing the solution, so that via the gas pressure the now solution can be conveyed in the direction of the microfluid chip 10 via the fluid connecting means 2.

In alternative embodiment variants it can also be provided that the solvent SOL is conveyed from a central solvent container into the reagent container 18 holding the phosphoramidite B1, B2, B3, B4 in powder form and not via four separate reagent containers 18 holding the solvent SOL1, SOL2, SOL3, SOL4.

Fundamentally, for the control of the microfluid valves 12 differently configured control devices 5 are conceivable, for example piezoelectrically driven stoppers or lids. In this exemplary embodiment the actuation of the microfluid valves 12 is carried out via a pneumatic system of the control device 5. While it is generally conceivable to provide for two separate pneumatic systems, one for the conveying of the reagents and one for the actuation of the microfluid valves 12, it is advantageous if the device comprises a single pneumatic system. In this exemplary embodiment, a pneumatic system, i.e. the pneumatic system of the control device 5, is therefore present, so that the pneumatic system of the control device 5 is also connected to the gas line channels 21 in the support plate 9 via the gas lines 27. In the following the pneumatic system is further discussed for the sake of transparency.

The pneumatic system is attachable via the connector portion 3b of the chip receptacle 3 to the microfluid valve 12 of the microfluid chip 10. For this purpose, the connector portion 3b has a control line channel 22 for each of the microfluid valves 12. Each control line channel 22 is thereby connected to one of the control lines 28 of the pneumatic system of the control device 5. For example, the control lines 28 can be pressed or glued in the control line channels 22.

The connector portion 3b can for example be configured directly as part of the chip receptacle 3 or for example as a separate plate fastened to the chip receptacle 3.

In order to be able to control the opening and closing of the microfluid valves 12 via the control device 5, each of the control lines 28 of the control device 5 is controllable via a separate control valve. Thereby the microfluid valves 12 in this exemplary embodiment are closed when the relevant control valve is open and vice versa.

On the basis of FIG. 9, the connection of the microfluid chip 10 to the fluid connecting means 2 and to the control device 5 is described in the following. FIG. 9 shows a device still in an intermediate position, wherein the microfluid chip 10 is on a positioning edge of the receptacle compartment 3a and the fluid connectors 11 are configured flush to the connector pieces 2a of the fluid connecting means 2, however they are still spaced apart. The fluid connectors 11 in this exemplary embodiment are configured as openings, for example drill holes, in the underside of the microfluid chip 10. The connector pieces 2a are attached to the support plate 9, wherein between the connector pieces 2a a support element 24 is arranged, to prevent a deflection of the microfluid chip 10 in the operating position.

The microfluid chip 10 has a first support layer 10a that forms the fluid connectors 11. These are thereby configured in this exemplary embodiment as openings in the underside of the microfluid chip 10. The connector pieces 2a of the fluid connecting means 2 are pressed onto the fluid connectors 11 and serve as further sealing elements that are pressed against the first support layer 10a or the underside of the chip 10 in the operating position, in order to guarantee the necessary impermeability of the connection with the reagent container 18. The fluid connectors 11 are oriented flush to the fluid connecting means 2.

The microfluid chip 10 is configured on a multilayer level and has two support layers 10b, which are pressed against the sealing elements 23 in the operating position and form the upper surface of the microfluid chip 10. The microfluid valves in this exemplary embodiment are shifted to the side opposite the control line channels 22 and arranged between the two support layers 10a, 10b. Thereby the microfluid valves 12 in this exemplary embodiment are configured as membranes.

In order to be able to actuate the microfluid valves 12 arranged within the microfluid chip 10 via the control lines 28 and the control line channels 22, the second support layer 10b has pneumatic connectors 15 configured as openings that are oriented flush to the control line channels 22. The microfluid valves 12 are connected to the pneumatic connectors 15 via pneumatic connecting channels 16. The actuation of a microfluid valve 12 is therefore carried out by the control device 5 via a control valve, a control line 28, a control line channel 22, a pneumatic connector 15 and a pneumatic connecting channel 16.

The connector portion 3b has sealing elements 23 on one of the surfaces facing the microfluid chip 10 or the second support layer 10b, which guarantee the pneumatic connection between the control line channel 22 and the microfluid valve 12 in the operating position, wherein the transition between the control line channels and the connectors 15 are sealed.

If the chip receptacle 3 is moved further in the direction of the support plate 9, the connector pieces 2a of the fluid connecting means 2 are clamped against the fluid connectors 11 or the first support layer 10a, wherein the microfluid chip 10 is lifted from the receptacle compartment 3a and clamped against a clamping surface of the connector portion 3b or against the sealing element 23. This operating position is shown in FIG. 8: The microfluid chip 10 is clamped between the clamping surface of the connector portion 3b or between the sealing elements 23 arranged on the clamping surface and the connector pieces 2a of the fluid connecting means 2. By clamping the connector pieces 2a to the fluid connectors 11 the connection between the reagent containers 18 and the microfluid chip 10 is sealed. The connector pieces 2a of the fluid connecting means 2 thereby also serve as further sealing elements and are preferably configured as malleable. The deformation of the sealing elements 23 by the clamping pressure guarantees the necessary impermeability of the connection between the control line channels 22 and the pneumatic connectors 15 of the microfluid chip 10 for the actuation of the microfluid valves. The support element 24 lies on the underside of the microfluid chip 10 formed by the first support layer 10a and prevents the deformation of the chip 10 due to the clamping.

In order to be able to remove the microfluid chip 10 from the device after synthesis, the chip receptacle 3 is moved away from the support plate 9, in order to arrive at the configuration illustrated in FIG. 9.

FIG. 10 shows a possible layout of a first embodiment variant of the microfluid chip 10, with which a synthesis of oligonucleotides is possible. The microfluid chip 10 has a fluid connection 13, which connects the synthesis chamber 14 with the fluid connectors 11. Each fluid connection 13 is blockable or releasable via a microfluid valve 12, so that via the position of the corresponding microfluid valve 12 the conveying of a reagent from one of the fluid connectors 11 to the synthesis chamber 14 can be achieved or blocked.

The fluid connection 13 is divided into a main channel 13a via which the reagents flow in the direction of the synthesis chamber and a plurality of connection channels 13b, which connect the main channel 13a with one of the fluid connectors 11 respectively.

Due to the offset of the microfluid valves 12 and the pneumatic connectors 15, a pneumatic connecting channel 16 connecting the respective valves 12 with the pneumatic connectors 15 is provided. The connecting channels 13b of the fluid connection 13 each end in a microfluid valve 12, so that the respective microfluid valve 12 is arranged between the main channel 13a and the connecting channel 13b.

In the present embodiment variant the main channel 13a is divided into two portions extending parallel to each other, referred to as branches in the following, which join together in front of the synthesis chamber 14 in a synthesis channel 26. In the synthesis chamber 14 there is a carrier medium with linker molecules, which serves as the starting point for the synthesis of the oligonucleotides. The synthesis chamber 14 can be configured for example as a funnel shape and can widen out in the flow direction. In order not to flush out the carrier medium during the flow through the synthesis chamber 14, a retention structure 25 is arranged in the direction of the flow, preferably directly behind the synthesis chamber 14.

In order to optimally exploit the construction space, one branch of the main channel 13a, at the end of which the fluid connector 11 for the solvent SOL and the pneumatic connector 15 for the inert gas GAS are arranged, two portions running parallel to each other are joined together on the one, preferably U-shaped, connecting piece. Thereby the connecting channels 13b of the reagents B1, B2, B3, B4 flow into the portion of the corresponding branch of the main channel 13a bordering the synthesis channel 26.

How the flow through the fluid connection 13 of the microfluid chip 10 is achieved, is described in the following based on the solvent SOL. This principle can be used analogously for all the other reagents.

In order to allow the solvent SOL to flow from the corresponding fluid connector 11 via the connecting channel 13b and the main channel 13a in the direction of the synthesis chamber 14, on the one hand the microfluid valve 12 controlling the connector 11 is opened. On the other hand a microfluid valve 12 is opened, which controls a further fluid outlet connector 11b configured as a second outlet W2. The second outlet connector 11b is arranged in the direction of the flow behind the synthesis chamber 14, so that the solvent SOL from the fluid connector 11 flows over the fluid connection 13, the synthesis chamber 14 and the second outlet connector 11b to the second outlet W2. The second outlet W2 can for example be configured through a waste container.

The microfluid valves 12 are fundamentally kept in a closed position, so that the connecting channels 13b are blocked off from the main channel 13a or the fluid connection 13 is interrupted. The closed position is achieved by the control device 5 exercising pressure over the microfluid valves 12 via the pneumatic system, more precisely via the control lines 28, the control line channels 22, the pneumatic connectors 15. If the pressure exercised by the control device 5 on one of the microfluid valves 12 is reduced or the pressurization is suspended, the corresponding microfluid valve 12 opens and the fluid connection 13 between the corresponding connecting channel 13b and the main channel 13a is created or open.

The connector 11 for the solvent SOL is attached in such a way to one side of a branch of the main channel 13a that none of the connecting channels 13b of the reagents necessary for the synthesis is positioned after this. Thus the fluid connection 13 can be washed by means of the solvent SOL, in order to remove the reagents. In order to be able to wash the second branch of the main channel 13a as well, a first outlet connector 11a configured as outlet W1 is provided, which is attached at one side to the second branch of the main channel 13a. If the microfluid valves 12 controlling the first outlet connector 11a and the microfluid valves 12 controlling connector 11 for the solvent SOL are opened simultaneously, the solvent SOL flows over the first branch of the main channel 13a into the second branch of the main channel 13a, without flowing through the synthesis chamber 14.

In addition to this a pneumatic connector 15 for an inert gas GAS is provided, which in this exemplary embodiment is connected to the pneumatic system. The pneumatic system contains the inert gas GAS, wherein this is argon in this exemplary embodiment. By the flow through the fluid connection 13 of the inert gas GAS, the fluid connection 13 is dried after washing with the solvent SOL.

Before the synthesis can begin, it is necessary to convey the reagents from the reagent containers 18 via the transport lines 2b of the fluid connecting means 2 to the microfluid valves 12. Therefore, in sequence, the microfluid valves 12 for the fluid connectors 11, the reagents necessary for the synthesis one after the other together with the microfluid valves 12 for the first outlet connector 11a of the first outlet W1 are opened. Between the individual conveying the main channel 13a is first washed by the simultaneous opening of the microfluid valve 12 for the solvent SOL and the microfluid valve 12 for the first outlet connector 11a of the first outlet W1 and then dried by opening the microfluid valve 12 for the inert gas GAS and the microfluid valve 12 for the first outlet connector 11a of the first outlet W1. Thereby none of the reagents enter the synthesis chamber 14 during the conveying, the washing and the drying. Through the simultaneous opening of the microfluid valves 12 for the inert gas GAS and one of the microfluid valves 12 for the fluid connectors 11 of the reagents necessary for the synthesis respectively, the reagents can be conveyed back into the reagent container 18 after the end of the synthesis.

In the following, the synthesis steps which are necessary in a synthesis cycle for the coupling of a nucleotide to the end of a subsequence of a oligonucleotide or as the first nucleotide to a linker molecule of a carrier medium are discussed. The sequence of the synthesis steps and the reagents used for this are known per se.

Each oligonucleotide starts at a linker molecule of a carrier medium arranged in the synthesis chamber 14 and is increased by one nucleotide with each synthesis step, which is coupled to the end of the chain. The 5'-OH group of the oligonucleotide is furnished with an acid-labile dimethoxytrityl protecting group (4,4'-dimethoxytrityl—DMT).

First of all, a reagent for the detritylation DEBL of one end of an oligonucleotide comprising a subsequence or for the detritylation of the linker molecule is conveyed to the synthesis chamber 14 from the corresponding reagent container 18. Thereby, as described previously, the microfluid valve 12 controlling the fluid connection 11 for the reagent for the detritylation DEBL is opened simultaneously with the second microfluid valve 12 controlling the outlet connector 11b.

In this way the DMT protecting group is removed so that a further nucleotide can be couple to the 5'-OH group. In the case of the reagent for the detritylation DEBL, in the present case this an acidic solution, namely a solution containing 2% trichloroacetic acid or 3% dichloroacetic acid in an inert solvent such as acetonitrile, dichloromethane or toluol is conceivable. This step is also designated a deblocking step.

In the next step the nucleotide chain on the detritylated, free 5'-OH group, is extended by an alkali, i.e. either adenine B1, guanine B2, cytosine B3 or thymine B4 for a DNA strand or uracil B4 for an RNA strand. For this a reagent for the activation of the free 5'-OH group and a reagent containing phosphoramidites with the corresponding base B1, B2, B3, B4 is alternately conveyed to the synthesis chamber. The phosphoramidites are conveyed dissolved in a solvent SOL, in particular acetonitrile. The activation of the 5'-OH group is in this example achieved by means of a 0.2-0.7 molar solution of an acid azole catalyst, in particular through 1H-tetrazole, 5-ethylthio-1H-tetrazole, 2-benzylthio tetrazole or 4,5-dicyanoimidazole. Thereby the nucleotide couples with the free 5'-OH group of the oligonucleotide, while the phosphoramidite residue is split. The 5'-OH group of the newly coupled nucleotide is once again protected by a DMT protecting group. This step is also called the coupling step.

In the synthesis chamber 14 in the next step a mixture of two reagents is conveyed to the blocking CAP1, CAP2 of the non-used 5'-OH groups. In the present case the blocking of the non-used 5'-OH groups is achieved by a mixture of acetate anhydride and 1-methylimidazole as catalyst. This step is also called the capping step.

In the last step in a synthesis cycle the oxidation of a phosphite triester coupling that is formed from the newly coupled nucleotide and the corresponding 5'-OH group of the oligonucleotide is carried out, in that a reagent is conveyed to oxidation OXI. The reagent for oxidation OXI oxidizes the phosphite triester bond in a fourfold coordinated phosphite triester, a protected forerunner of the naturally occurring phosphate diester internucleotide linkage. Thereby the bond between the coupled nucleotide and the corresponding 5'-OH group is stabilized. In the present case, oxidation is carried out under anhydrous conditions by means of (1S)-(+)-(10-camphorsulfonyl)-oxaziridine (CSO) or tert-butyl hydroperoxide (TBHP). This step is called the oxidation step.

In the method according to the invention the microfluid chip 10 or the fluid connection 13 is washed and dried after each step in the synthesis cycle, as described above. It is particularly advantageous thereby if during the washing and drying the microfluid valves 12, the fluid outlet connectors 11a, 11b configured as outlet W1, W2 are alternately opened and closed.

The opening duration of the microfluid valves 12, by means of which the quantities of reagents entering the synthesis chamber 14 and the duration of the synthesis step or the duration of the washing or drying are determined, is controlled by the control device 5. In particular, the control device 5 has a programming, which is configured in such a way that for each of the synthesis steps, the washing and drying processes, the necessary opening time of the corresponding microfluid 12 is determined.

The four steps of a synthesis cycle are repeated in the order of the nucleotide sequence of the oligonucleotide to be synthesized as often as required until the oligonucleotide has the predetermined length and sequence. As soon as the oligonucleotide to be synthesized is ready, a reagent for the splitting of the oligonucleotides from the linker molecule and for the removal of the protecting groups CL/DE is conveyed to the synthesis chamber 14. In the present case, a mix of ammonia and methylamine is used as a reagent for the splitting of the oligonucleotides from the linker molecule and for the removal of the protecting groups CL/DE, wherein both reagents are preferably contained in the mixture in equal parts. This reagent CL/DE releases the oligonucleotide from the linker molecule, wherein this process lasts approximately 3 to 15 minutes, as a rule approximately 5 minutes. In particular, the fluid connector 11 is opened for a microfluid valve 12 controlling a product collection container PRO, in order to convey the synthesized oligonucleotide into the product collection container. The removal of the protective group lasts approximately a further 3 to 15 minutes, as a rule approximately 5 minutes, if the product collection container PRO, is brought to a temperature of between 50° and 75° , preferably 75° C., via an integral heating block. At room temperature this process requires between 45 and 120 minutes, as a rule approximately 60 minutes.

After the conclusion of the synthesis, the product collection container PRO can be removed and further processed. The device can then be moved from the loading position to the operating position, wherein the previously described steps (FIGS. 4, 3, 2) are carried out in reverse order, in order to be able to remove or replace both the microfluid chip 10 as well as the reagent container support 17 from the device.

Figure 11:
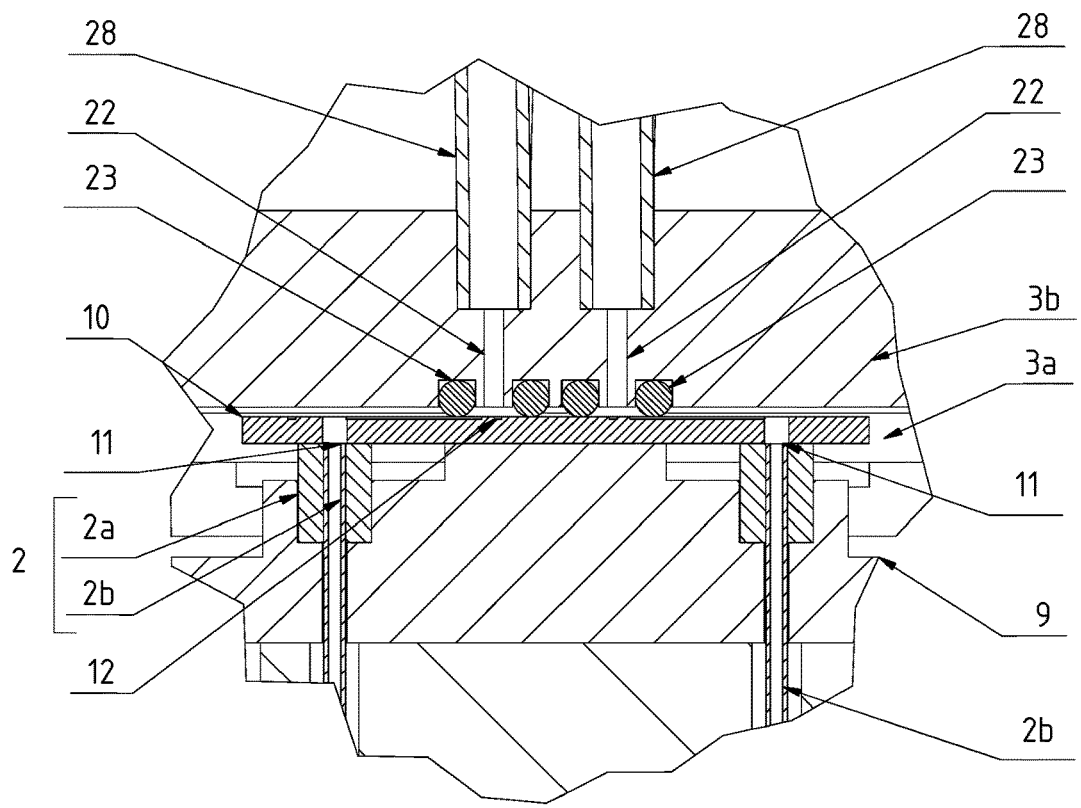
FIG. 11 shows an enlarged detailed view of a second embodiment variant of the device for a second embodiment variant of the microfluid chip analogous to FIG. 8.
Figure 12:
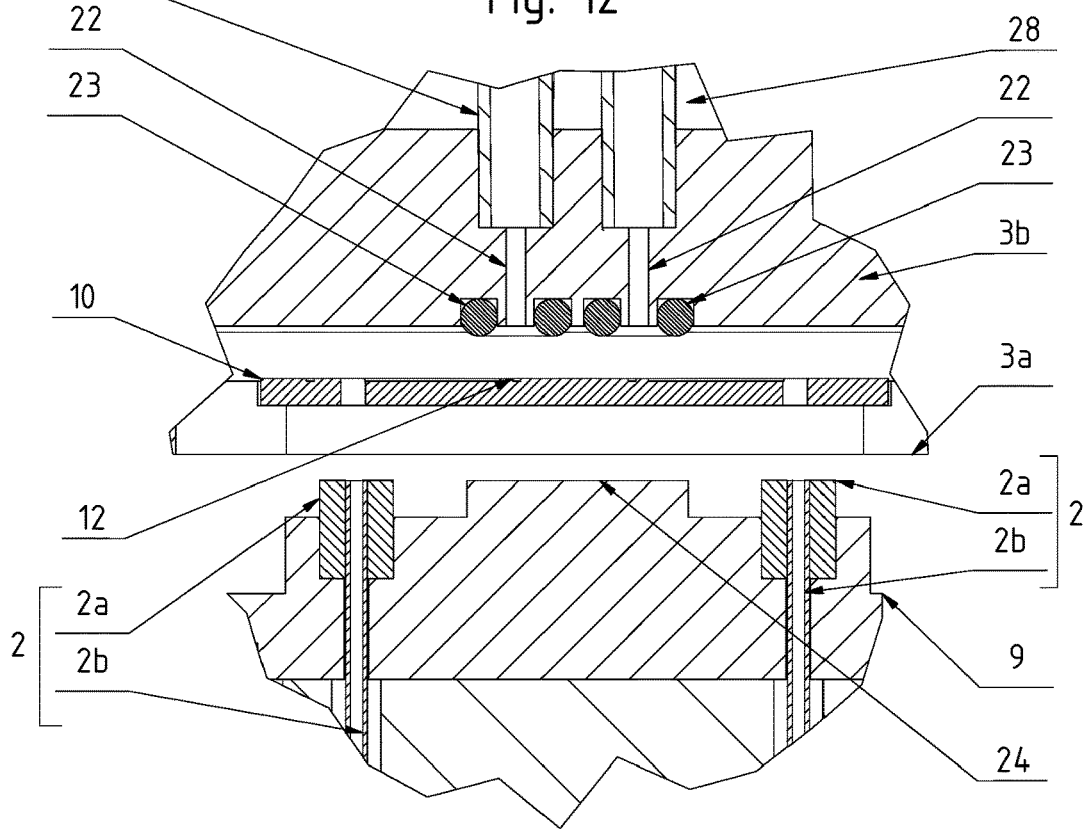
FIG. 12 shows an enlarged detailed view of the device in the intermediate position for a second embodiment variant of the microfluid chip analogous to FIG. 9.

FIGS. 11 and 12 show a second embodiment variant of the device in which a second, preferred embodiment variant of the microfluid chip 10 is used. Since the fundamental construction of the device remains unchanged, in the following simply the differences will be described. In particular, FIGS. 11 and 12 clarify in comparison to FIGS. 8 and 9, the structural differences of both of the embodiment variants. In both of the embodiment variants the pneumatic connecting means 4 are configured as transport channels directly connected to the support plate 9, which are bonded into the gas line channels 21, for example.

The different structure of the microfluid chip 10 and the resulting differences regarding the connection to the fluid connecting means 2 and with the connection to the control device 5 are discussed based on FIGS. 11 and 12.

In the second embodiment variant the microfluid chip 10 is configured in one layer, wherein preferably the microfluid valves 12 are also designed in the material of the microfluid chip 10, the microfluid chip 10 is therefore configured monlithically. The microfluid valves 12 are thereby designed on one side of the microfluid chip 10, in the present exemplary embodiment on the upper surface, and the fluid connectors 11 on the side facing the microfluid valves 12, in the present exemplary embodiment on the lower surface. The microfluid valves 12 face the connector portion 3b of the chip receptacle 3 and are aligned flush with the control line channels 22, however at a distance from these.

In this embodiment variant, the microfluid valves 12 are connected directly to the control lines 28 or the control line channels 22, so that no pneumatic connectors 15 or no pneumatic connecting channels 16 are necessary. When the microfluid chip 10 is clamped between the connector pieces 2a of the fluid connecting means 2 and the sealing elements 23, as can be seen in FIG. 11, the sealing elements 23 seal the space between the microfluid valves 12 arranged on the upper side of the microfluid chip 10. By pressurization of the microfluid valves 12 via the control lines 28 of the pneumatic system, the microfluid valves 12 configured as a membrane are deformed and interrupt the fluid connection 13.

Finally, FIG. 13 shows the layout of the second embodiment variant of the microfluid chip 10. As previously, only the differences to the layout described above will be discussed in the following. For the sake of transparency let it be said that the steps in the synthesis cycle are carried out completely analogously.

In the present exemplary embodiment some of the microfluid valves 12 are arranged within the connecting channels 13b and not on one side in the transition between the connecting channels 13b and the main channel 13a. As mentioned earlier, in this embodiment variant neither pneumatic connectors 15 nor pneumatic connecting lines are envisaged in the microfluid chip 12.

The inert gas GAS is conveyable via a fluid connector 11, which however, for example via the gas line channels 21, is attached to the pneumatic system. In alternative embodiment variants, two separate fluid connectors 11 or two separate reagent containers 18 can be envisaged for the reagent for the splitting of the oligonucleotides from the linker molecule and for the removal of the protecting groups CL/DE.

In both of the embodiment variants of the microfluid chip 10, the fluid connectors 11 for the reagents for carrying out the synthesis cycles are connected to the main channel 13a in such a way that the fluid connectors 11 for the bases B1, B2, B3, B4 and the reagent for the activation ACT are connected to the first branch of the main channel 13a and the fluid connectors 11 for the reagent for the detritylation DEB, the reagent for the oxidation OXI as well as both of the reagents for the blocking of the non-used 5'-OH groups CAP1, CAP2 are connected to the second branch of the main channel 13a. It is self-evident that the bases B1, B2, B3, B4 can be attached to the main channel 13a in any preferred sequence.

At the end of the first branch of the main channel 13a, the connectors 11, 15 for the conveying of the solvent SOL and the inert gas GAS are connected. At the end of the second branch of the main channel 13a, the first outlet connector 11a for the first outlet WI is connected. The second branch of the main channel 13a is furthermore connected to the fluid connector 11 for the reagent for the splitting of the oligonucleotides from the linker molecule and for the removal of the protecting groups CL/DE.

At the transition between the two branches of the main channel 13a and the synthesis channel 26 there is also a microfluid valve 12 in the embodiment variant illustrated, which can close the synthesis channel 26, for example during the conveying of the reagents.

Figure 14:
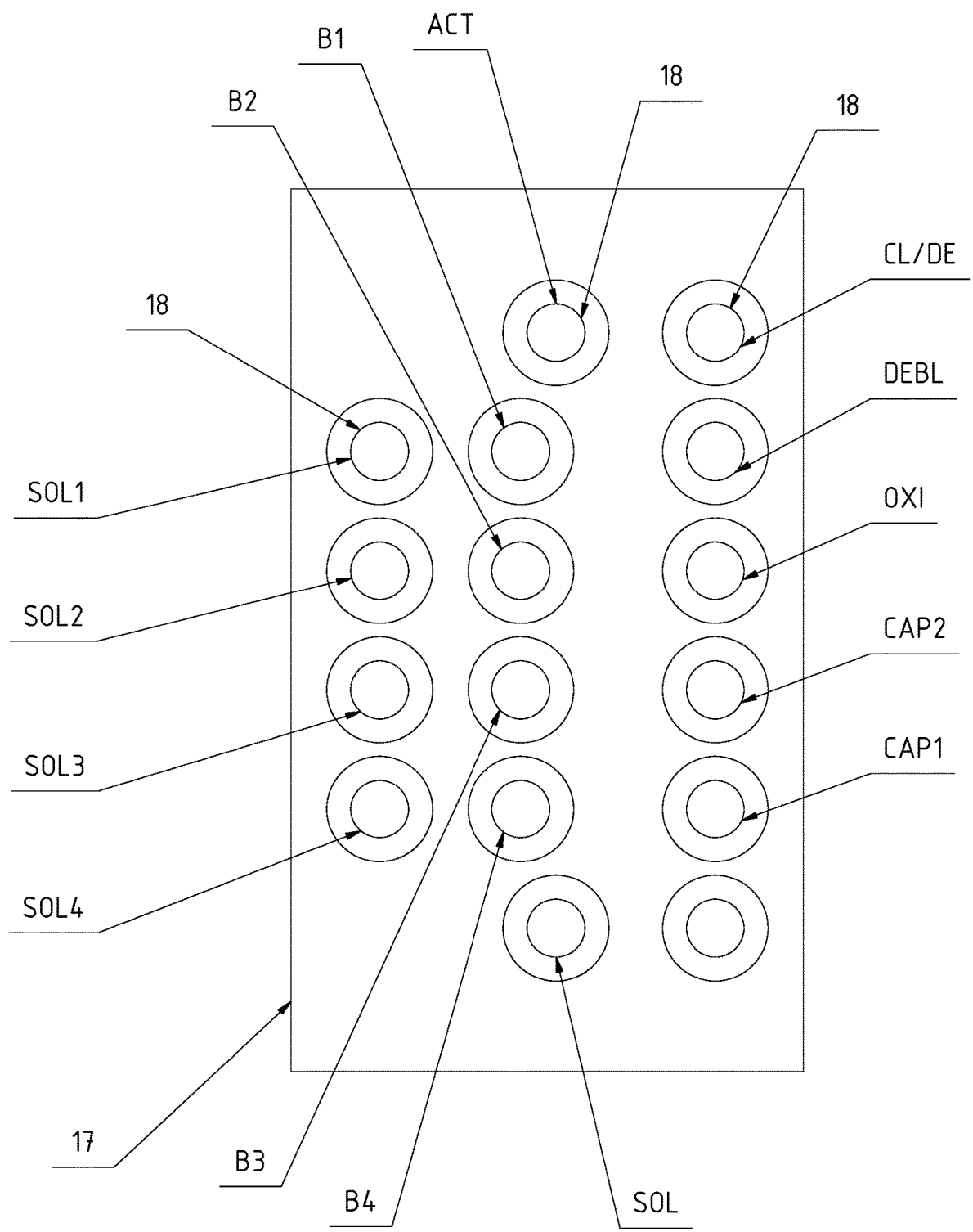
FIG. 14 shows the layout of a embodiment variant of a reagent container support.

In FIG. 14 the sequence of the reagent containers 18 containing the reagents in the reagent container support 17 is given as an example, wherein the sequence of the reagent containers 18 is determined according to the second, preferred embodiment of the microfluid chip 10.

The reagent containers 18 are divided into three columns in the figure, wherein for the sake of transparency only the upper reagent container 18 in a column is provided with a reference mark.

The middle column contains from top to bottom reagent containers 18 for the following reagents: reagents for the activation ACT of a detritylated 5'-OH group,
phosphoramidite of the first base adenine B1 in powder form,
phosphoramidite of the second base guanine B2 in powder form,
phosphoramidite of the third base cytosine B3 in powder form,
phosphoramidite of the fourth base thymine or uracil B4 in powder form as well as the solvent SOL.

The left column comprises contains from top to bottom four reagent containers 18 containing solvent SOL, preferably acetonitrile, wherein the first reagent container 18 contains solvent SOL1 for the first base B1, the second reagent container 18 contains solvent SOL2 for the second base B2, the third reagent container 18 contains solvent SOL3 for the third base B3, and the fourth reagent container 18 contains solvent SOL4 for the fourth base B4. Thereby the reagent containers 18 for the solvents SOL1, SOL2, SOL3, SOL4 are always arranged in pairs with the corresponding reagent containers 18 for the bases B1, B2, B3, B4.

The right column includes from top to bottom reagent containers 18 for the following reagents: a reagent for the splitting of the oligonucleotides from the linker molecule and for the removal of the protecting groups CL/DE, reagent for the detritylation DEBL of one of the 5'-OH groups containing a dimethoxytrityl protecting group, reagent for the oxidation OXI of a phosphite triester bond, second reagent for blocking CAP2 non-used 5'-OH groups, first reagent for blocking CAP1 non-used 5'-OH groups.

Thereby the reagent containers 18 in the middle column are connectible to the fluid connectors 11 of the first branch of the main channel 13a of the microfluid chip 10 and the reagent containers 18 in the right column are connectible to the fluid connectors 11 of the second branch of the main channel 13a of the microfluid chip 10.

LIST OF REFERENCE NUMERALS 1 reagent container receptacle
1a connecting portion
2 fluid connecting means
2a connector piece
2b transport line
3 chip receptacle
3a receptacle compartment
3b connector portion
3c connecting portion
4 pneumatic connecting means
5 control device
6 actuator device
7 linear movement axis of the actuator device
8 rack
8a track
9 support plate
10 microfluid chip
10a first support level
10b second support level
11 fluid connector
11a first outlet connector
11b second outlet connector
12 microfluid valve
13 fluid connection
13a main channel
13b connecting channel
14 synthesis chamber
15 pneumatic connector
16 pneumatic connecting channels
17 reagent container support
18 reagent container
19 sealing element
20 connecting lines
21 gas line channel
22 control line channel
23 sealing element
24 support element
25 retention structure
26 synthesis channel
27 gas lines
28 control line
SOL solvent
GAS inert gas
ACT reagent for activating a detritylated 5'-OH group
B1 Base 1 (for example phosphoramidite of the base adenine)
B2 Base 2 (for example phosphoramidite of the base guanine)
B3 Base 3 (for example phosphoramidite of the base cytosine)
B4 Base 4 (for example phosphoramidite of the base thymine or uracil)
W1 first outlet
CL/DE reagent for the splitting of the oligonucleotides from the linker molecules or a reagent for the removal of the protecting groups
DEBL reagent for the detritylation of a 5'-OH group equipped with a dimethoxytrityl protecting group
OXI reagent for the oxidation of a phosphite triester bond
CAP1 first reagent for the blocking of non-used 5'-OH groups
CAP2 second reagent for the blocking of non-used 5'-OH groups
PRO product collection container
W2 second outlet
SOL1 solvent for the dissolution of base 1
SOL2 solvent for the dissolution of base 2
SOL3 solvent for the dissolution of base 3
SOL4 solvent for the dissolution of base 4

The invention claimed is:

1. A device for synthesizing oligonucleotides in which the device comprises:
a reagent container receptacle for holding a reagent container support comprising multiple reagent containers for reagents for the synthesis of oligonucleotides;
an interchangeable microfluid chip comprising a synthesis chamber for the synthesis of oligonucleotides, fluid connectors for the conveying of the reagents as well as microfluid valves, wherein the fluid connectors are connected to the synthesis chamber via a fluid connection and the fluid connection between a respective fluid connector and the synthesis chamber can be interrupted or released by means of a microfluid valve;

a control device for controlling the microfluid valves;

fluid connecting means for the transport of the reagents from the reagent containers to the fluid connectors of the microfluid chip, wherein in a loading position the device can be loaded with the microfluid chip, and the reagent container receptacle can be loaded with the reagent container support, a chip receptacle for holding the microfluid chip, wherein an actuator device is provided, with which the reagent container receptacle, the microfluid chip, by means of the chip receptacle, and the fluid connecting means can be brought from the loading position to an operating position, in which operating position the reagent container receptacle, the chip receptacle and the fluid connecting means are positioned relative to each other by means of the actuator device in such a way, that the microfluid valves of the microfluid chip are connected to the control device, that the reagent containers arranged in the reagent container receptacle are connected to the fluid connectors of the microfluid chip via the fluid connecting means, so that depending on the valve position of the microfluid valves reagents can be conveyed from the reagent containers in the direction of the synthesis chamber.

2. The device according to claim 1, wherein the control device has a pneumatic system for controlling the microfluid valves.

3. The device according to claim 1, wherein the actuator device has a linear movement axis and the positioning of the reagent container receptacle or fluid connector pieces or chip receptacle occurs along the linear movement axis.

4. The device according to claim 1, wherein the actuator device has a rack, wherein the fluid connecting means are attached firmly to the rack and wherein the reagent container receptacle and the chip receptacle are shiftably or swivellably attached to the rack in the direction of the fluid connecting means, in order for the reagent container receptacle and the microfluid chip to be moved from the loading position to the operating position and vice versa.

5. The device according to claim 1, wherein the chip receptacle has a connector portion for the connection of the microfluid chip to the control device, wherein the connector portion has control line channels for the pneumatic system of the control device, which are connected to a respective microfluid valve of the microfluid chip in the operating position.

6. The device according to claim 1, wherein the components of the device in the operating position are positioned relative to each other in the following order:
  reagent container receptacle
  fluid connecting means
  chip receptacle with microfluid chip, wherein the fluid connectors are arranged on a side of the microfluid chip facing the fluid connecting means and the microfluid valves are attached to the control device on a side of the microfluid chip opposite to the fluid connectors.

7. The device according to claim 1, wherein each fluid connecting means comprises a connector piece for connection with one of the fluid connector of the microfluid chip and a needle-like transport line for connection to one of the reagent containers and that pneumatic connecting means are provided, which are connectable to the reagent containers, via which pneumatic connecting means in the operating position a pneumatic system is connected to the reagent containers arranged in the reagent container receptacle, in order to convey reagents from the reagent containers via the fluid connecting means in the direction of the microfluid chip by means of the gas pressure of the pneumatic system.

8. The device according to claim 7, wherein, in the operating position, one end of a transport line of one of the fluid connecting means and one end of one of the pneumatic connecting means is respectively positioned within one of the liquid reagent containers, in order to convey reagents from the reagent container in the direction of the synthesis chamber by means of gas pressure of the pneumatic system, wherein the transport line and the pneumatic connecting means penetrate a sealing element of the corresponding reagent container.

9. The device according to claim 7,
wherein, in the operating position, at least one pair of corresponding reagent containers is provided in the reagent container receptacle, wherein one of the reagent containers contains a solid, namely, phosphoramidite of the bases adenine, guanine, cytosine, thymine or uracil in powder form, and the other one of the reagent containers contains a solvent,
and that in the operating position one end of one of the pneumatic connecting means
is arranged in the reagent container holding the solvent, and one end of one of the transport lines is arranged in the reagent container holding the solid, and that a connecting line connects both of the reagent containers with each other,
so that via the gas pressure of the pneumatic system, solvents are transferred from the one reagent container into the other reagent container, the solid in the reagent container dissolves in the solvent and the solution can be conveyed in the direction of the synthesis chamber.

10. The device according to claim 7, wherein the control device has a pneumatic system for controlling the microfluid valves and that the reagent containers are connected via the pneumatic connecting means with the pneumatic system of the control device.

11. The device according to claim 7, wherein the fluid connecting means and the pneumatic connecting means are fixed to a support plate, said support plate being firmly attached to a rack in the actuator device, wherein the support plate has gas line channels, via which gas line channels the pneumatic system is connected to the pneumatic connecting means in the operating state.

12. The device according to claim 7, wherein
the reagent containers are sealed by a respective sealing element, wherein
the pneumatic connecting means and/or the fluid connecting means are configured in such a way that with the movement from the loading position to the operating position the sealing elements of a plurality of the reagent containers are penetrated simultaneously.

13. The device according to claim 1, wherein the reagent container support comprises at least six reagent containers and is arranged in the reagent container receptacle, wherein each of the reagent containers contains one of the following reagents:
  one reagent containing phosphoramidites of the bases adenine, guanine, cytosine, thymine or uracil;
  one reagent for the detritylation of an end of an oligonucleotide;

one reagent for the activation of a detritylated 5'-OH group of an oligonucleotide and for the coupling of the phosphoramidite;
one reagent for the oxidation of a phosphite triester;
optionally at least one reagent for blocking non-implemented 5'-OH groups of activated oligonucleotides;
wherein each reagent container is sealed with a sealing element.

14. The device according to claim 1, wherein the fluid connection of the microfluid chip comprises a main channel connected to the synthesis chamber and a plurality of fluid connecting channels, wherein each fluid connector is connected to the main channel via a fluid connecting channel and a microfluid valve.

15. The device according to claim 1, wherein the microfluid chip is configured either in one layer, wherein the microfluid valves are configured as membranes and arranged on an exterior surface of the microfluid chip
or that the microfluid chip is configured with multiple layers, wherein the microfluid chip comprises a first support layer comprising the fluid connectors
as well as a second support layer, wherein the second support layer
is designed for connection to the control device and the microfluid valves are positioned between the first and the second support layer.

16. A method for operating a device for synthesizing oligonucleotides, the device comprising
a reagent container receptacle in which a reagent container support comprising multiple reagent containers filled with reagents is arranged;
a microfluid chip with a synthesis chamber for the synthesis of the oligonucleotide, with microfluid valves and with fluid connectors for the conveying of the reagents;
a control device for the control of the microfluid valves;
fluid connecting means for the transport of the reagents from the reagent containers to the fluid connectors of the microfluid chip, wherein
the following steps are carried out:
positioning of the microfluid chip in the device, so that the fluid connectors of the microfluid chip are aligned flush with the fluid connecting means and the microfluid valves of the microfluid chip can be connected to the control device;
positioning of the microfluid chip by means of a chip receptacle that is moveable via an actuator device until a connection between the fluid connectors of the microfluid chip and the fluid connecting means is created;
connection of the microfluid valves to the control device;
positioning of the reagent container receptacle by means of the actuator device until a connection between the reagent containers and the fluid connectors of the microfluid chip is created via the fluid connecting means, so that depending on the valve position of the microfluid valves reagents can be conveyed out of the reagent containers in the direction of the synthesis chamber.

17. The method according to claim 16, wherein the control device includes a pneumatic system for the control of the microfluid valves and that the microfluid valves are connected to the pneumatic system of the control device.

18. The method according to claim 16, wherein the chip receptacle has a connector portion for the connection of the microfluid valves of the microfluid chip to the control device, in particular to the pneumatic system of the control device, wherein the connector portion is swiveled by means of the actuator device during the movement into the operating position, in order to connect the microfluid valves to the control device, wherein the microfluid chip is clamped
between the fluid connecting means and the connector portion.

19. The method according to claim 16, wherein the reagent containers are connected to a pneumatic system via pneumatic connecting means and reagents are transported out of the reagent containers in the direction of the synthesis chamber via gas pressure of the pneumatic system.

20. The method according to claim 19, wherein the reagent containers are closed by a respective sealing element and the pneumatic connecting means and/or the fluid connecting means during positioning simultaneously penetrate the sealing elements of a plurality of the reagent containers.

21. The method according to claim 16, wherein before the start of the synthesis of an oligonucleotide the following steps are carried out:
opening of a microfluid valve that controls a fluid connector for the conveying of reagents out of a reagent container;
closing of the opened microfluid valve when reagent flows through the microfluid valve;
washing of a main channel of the microfluid chip by opening a microfluid valve that controls a fluid connector for conveying a solvent;
optionally drying of main channel of the microfluid chip by opening a microfluid valve that controls the conveying of an inert gas;
repeating the above steps until each reagent from the reagent containers connected to the fluid connectors of the microfluid chip has been conveyed to the respective microfluid valve of the corresponding fluid connector.

22. The method according to claim 16, wherein for the synthesis of an oligonucleotide the following steps are carried out:
opening of a microfluid valve that controls a fluid connector for the conveying of a reagent for the detritylation of one 5'-OH group of the oligonucleotide containing a dimethoxytrityl protecting group or for the detritylation of a linker molecule of a carrier medium from a reagent container;
alternate opening of a microfluid valve, that controls a fluid connector for the conveying of a reagent for the activation of the detritylated 5'-OH group from a reagent container and of a microfluid valve, that controls a fluid connector for the conveying of a reagent containing phosphoramidites of the bases adenine or guanine or cytosine or thymine or uracil from a reagent container;
optionally opening at least one microfluid valve that controls a fluid connector for the conveying of a reagent for the blocking of non-used 5'-OH groups from a reagent container;
opening of a microfluid valve that controls a fluid connector for the conveying of a reagent for the oxidation of a phosphite triester bond from a reagent container;
repeating of the previous steps.

* * * * *